United States Patent [19]

Shiraishi et al.

[11] Patent Number: 5,280,347
[45] Date of Patent: Jan. 18, 1994

[54] COLOR IMAGE SENSING DEVICE

[75] Inventors: Akihiko Shiraishi, Kawasaki; Akira Suga, Tokyo; Takashi Sasaki, Yokohama, all of Japan

[73] Assignee: Canon Kabushiki Kaisha, Tokyo, Japan

[21] Appl. No.: 782,620

[22] Filed: Oct. 25, 1991

[30] Foreign Application Priority Data

Oct. 30, 1990 [JP] Japan ................................. 2-290819
Oct. 30, 1990 [JP] Japan ................................. 2-290820
Nov. 2, 1990 [JP] Japan ................................. 2-295212
Nov. 5, 1990 [JP] Japan ................................. 2-297071
Nov. 5, 1990 [JP] Japan ................................. 2-297072
Nov. 6, 1990 [JP] Japan ................................. 2-299028

[51] Int. Cl.⁵ ......................... H04N 9/70; H04N 9/77
[52] U.S. Cl. ...................................... 358/41; 358/44; 358/43; 358/37
[58] Field of Search ....................... 358/44, 41, 43, 36, 358/37, 29 C, 27, 31, 166, 167; H04N 9/70, 9/77

[56] References Cited

U.S. PATENT DOCUMENTS 4,754,323 6/1988 Kaji et al. ............................ 358/44
4,974,066 11/1990 Tsuji ..................................... 358/44
5,034,805 7/1991 Ishizaka ............................... 358/41

FOREIGN PATENT DOCUMENTS 0013191 1/1987 Japan ............................. H04N 9/7
0053586 3/1987 Japan ............................. H04N 9/7
0207089 9/1987 Japan ............................ H04N 9/77

Primary Examiner—James J. Groody
Assistant Examiner—Michael H. Lee
Attorney, Agent, or Firm—Robin, Blecker, Daley & Driscoll

[57] ABSTRACT

A color image sensing device comprises an image sensor having pixels of the offset sampling structure in which the horizontal pitch is $P_H$, the vertical pitch is $P_V$ and the horizontal offset amount is $P_H/2$, and a color filter array comprising three or four types of color filters provided in one-to-one relation to the pixels of the image sensor. The color filter array has the offset sampling structure in which those types of color filters are each arranged with the horizontal pitch of $2P_H$, the vertical pitch of $2P_V$ and the horizontal offset amount of $P_H$.

10 Claims, 22 Drawing Sheets

● ··· CARRIER OF LUMINANCE SIGNAL
△ ··· CARRIER OF COLOR SIGNAL

FIG. 40
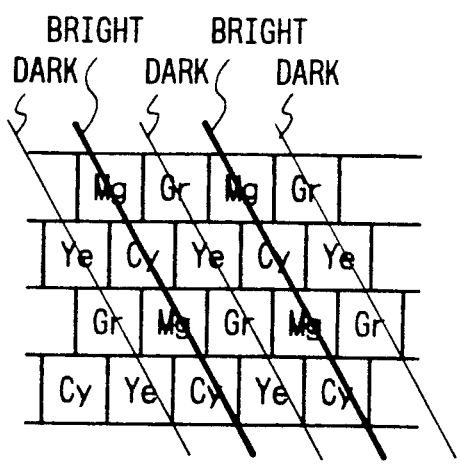
FIG. 41
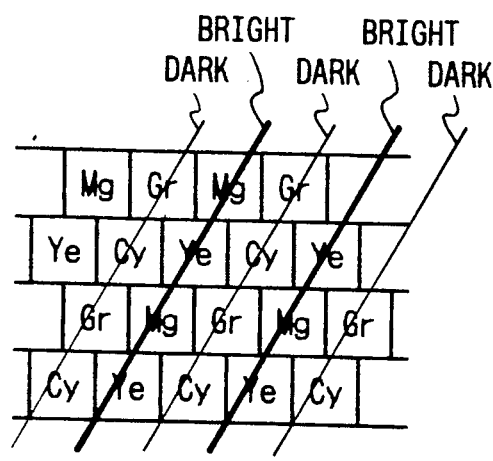
FIG. 44
| P | Q | MATRIX |
|---|---|--------|
| 0 | 0 | M1 OR M2 |
| 1 | 0 | M1 |
| 0 | 1 | M2 |
| 1 | 1 | M3 |
FIG. 45
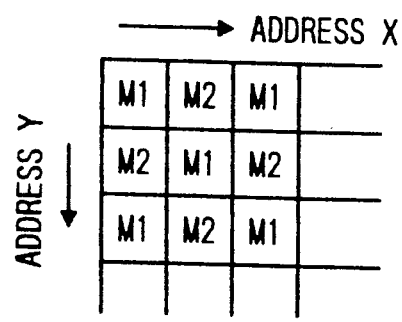

COLOR IMAGE SENSING DEVICE

BACKGROUND OF THE INVENTION

1. Field of the Invention

The present invention relates to an arrangement of color filters for an image sensor in which pixels have the offset sampling structure.

2. Related Background Art

FIGS. 1, 2 and 3 show conventionally known examples of an arrangement of color filters for a color solid-state image sensing device. In FIG. 1, green light transmissive filters (hereinafter referred to as "Gr filters") are vertically arrayed in the stripe form. Red light transmissive filters (hereinafter referred to as "Rd filters") and blue light transmissive filters (hereinafter referred to as "Bl filters") are arrayed two rows apart vertically and one column apart horizontally between the Gr filters.

In FIG. 2, magenta light transmissive filters (hereinafter referred to as "Mg filters"), green light transmissive filters, cyan light transmissive filters (hereinafter referred to as "Cy filters"), and yellow light transmissive filters (hereinafter referred to as "Ye filters") are arranged in the sequence as shown in units of eight color filters consisted of horizontal two pixels and vertical four pixels.

FIG. 3 is concerned with a solid-state image sensor having the offset sampling structure disclosed in Japanese Patent Application No. 1-24433, for example. In this offset sampling structure, Rd, Gr and Bl filters are arranged in units of three color filters consisted of horizontal three pixels and vertical one pixel with an offset amount of 1.5 pixels in the horizontal direction between two rows.

FIGS. 4, 5 and 6 are characteristic diagrams of the first quadrant as obtained by expressing color light carriers in the color filter arrangements of FIGS. 1, 2 and 3 using the two-dimensional frequency plane $(f_H, f_V)$, respectively. Assuming that the horizontal pixel pitch is $P_H$ and the vertical pixel pitch is $P_V$, each diagram represents an area of $0 \leq f_H \leq 1/P_H$ and $0 \leq f_V \leq \frac{1}{2}P_V$. In any diagram, the arrow indicates a carrier of each color, the arrow length indicates a magnitude of the carrier, and the arrow direction indicates a phase relationship.

In FIG. 4, color light carriers occur at $(\frac{1}{2}P_H, 0)$, $(1/P_H, 0)$, $(0, \frac{1}{4}P_V)$, $(\frac{1}{2}P_H, \frac{1}{4}P_V)$ and $(1/P_H, \frac{1}{4}P_V)$ other than $(0, 0)$. Among them, $(0, 0)$ and $(1/P_H, 0)$ represent the carriers which occur for achromatic light and cause turn-back distortions. The remaining carriers are perfectly canceled out and disappeared for achromatic light, but not disappeared for chromatic light and cause turn-back distortions.

Likewise, in FIG. 5, color light carriers occur at $(\frac{1}{4}P_H, 0)$, $(1/P_H, 0)$, $(\frac{1}{2}P_H, \frac{1}{4}P_V)$, $(0, \frac{1}{2}P_V)$, $(\frac{1}{2}P_H, \frac{1}{2}P_V)$ and $(1/P_H, \frac{1}{2}P_V)$ other than $(0, 0)$. Among them, $(0, 0)$ and $(1/P_H, 0)$ represent the carriers which occur for achromatic light and others represent the carriers which are disappeared for chromatic light.

In FIG. 6, assuming that the horizontal offset amount of the solid-state image sensor is $P_H/2$, color light carriers occur at $(\frac{2}{3}P_H, 0)$, $(\frac{1}{3}P_H, \frac{1}{2}P_V)$ and $(1/P_H, \frac{1}{2}P_V)$. Among them, $(0, 0)$ and $(1/P_H, \frac{1}{2}P_V)$ represent the carriers which occur for achromatic light and others represent the carriers which are disappeared for chromatic light.

It is generally known that the above offset sampling structure has a feature as follows. With the rectangular sampling structure as shown in FIGS. 1 and 2, since the carrier occurs for achromatic light at the frequency corresponding to the horizontal position of $(1/P_H, 0)$, $f_H = \frac{1}{2}P_H$ becomes the Nyquist's frequency and the frequency component thereabove cannot be obtained. Thus, the horizontal resolution obtainable with this structure is maximally $f_H = \frac{1}{2}P_H$. On the other hand, with the offset sampling structure as shown in FIG. 3, the carrier does not occur for achromatic light at the frequency corresponding to the horizontal position of $(1/P_H, 0)$ and $f_H = 1/P_H$ can become the Nyquist's frequency. Therefore, although the color filter arrangement of FIG. 3 has the same sampling pitch as the rectangular sampling structure of FIGS. 1 and 2, it can realize the horizontal resolution twice the above cases, i.e., $f_H = 1/P_H$.

However, because objects to be usually photographed are not always achromatic but colored in general cases, the color light carriers at all the positions shown in FIGS. 4, 5 and 6 generate turn-back distortions, so that some scenes may be awkward or hard to see. This necessitates use of an optical low-pass filter or the like to cut the detrimental color light carriers, which leads to a reduction in the resolution.

In the color solid-state image sensing device with the offset sampling structure shown in FIGS. 3 and 6, for example, the color light carrier occurs at the position of $(\frac{2}{3}P_H, 0)$ and, therefore, an optical low-pass filter capable of cutting off the frequency component above $f_H = \frac{2}{3}P_H$ in the horizontal direction is required. This means that while the horizontal resolution up to $f_H = 1/P_H$ could be intrinsically obtained for achromatic light, the practically obtainable horizontal resolution is only $\frac{2}{3}$ of that, i.e., $f_H = \frac{2}{3}P_H$.

SUMMARY OF THE INVENTION

The present invention has been made to solve the problem as mentioned above, and its object is to provide a color image sensing device which has good resolution and causes less moires, and which can produce the horizontal resolution up to $f_H = 1/P_H$ even with the sampling structure having the horizontal pixel pitch of $P_H$ and the vertical pixel pitch of $P_V$.

To achieve the above object, a color image sensing device according to one embodiment of the present invention is constituted as follows.

Specifically, the color image sensing device comprises an image sensor having pixels of the offset sampling structure in which the horizontal pitch is $P_H$, the vertical pitch is $P_V$ and the horizontal offset amount is $P_H/2$, and a color filter array comprising three or four types of color filters provided in one-to-one relation to the pixels of the image sensor, the color filter array having the offset sampling structure in which those types of color filters are each arranged with the horizontal pitch of $2P_H$, the vertical pitch of $2P_V$ and the horizontal offset amount of $P_H$.

With the color image sensing device thus constituted, the horizontal resolution up to $f_H = 1/P_H$ is obtained for achromatic light and the horizontal and vertical resolutions are less reduced for chromatic light.

Another embodiment of the present invention is to provide an image sensing device in which the image sensor using a color filter array of the offset sampling structure according to the above embodiment is combined with an optical low-pass filter which is effective in suppressing occurrence of color moires.

To achieve the above object, a color image sensing device according to still another embodiment of the present invention is given by (1) or (2) below.

(1) A color image sensing device featured in comprising the following components a, b and c:

a. an image sensor having pixels of the offset sampling structure in which the horizontal pitch is $P_H$, the vertical pitch is $P_V$ and the horizontal offset amount is $P_H/2$;

b. a color filter array comprising four types of color filters provided in one-to-one relation to the pixels of the above image sensor, the color filter array having the offset sampling structure in which those types of color filters are each arranged with the horizontal pitch of $2P_H$, the vertical pitch of $2P_V$ and the horizontal offset amount of $P_H$; and c. conversion means for converting outputs of the pixels associated with the four types of color filters into RGB signals through matrix operation of 3 row×4 column, the matrix being set such that, for each row, the sum of coefficients of first two columns is equal to the sum of coefficients of the remaining two columns.

(2) A color image sensing device according to (1) and including an optical low-pass filter which is disposed in an image sensing optical system and divides an incident light beam into twos spaced through a distance D in a direction turned by an angle $\theta$ counterclockwise relative to the scanning direction of the image sensor or in an direction turned by an angle $\theta$ clockwise relative to the reversed scanning direction of the image sensor, the optical low-pass filter meeting the conditions below;

$$\frac{1.6P_HP_V}{|P_H\sin\theta + 2P_V\cos\theta|} \leq D \leq \frac{2.4P_HP_V}{|P_H\sin\theta + 2P_V\cos\theta|}$$

where $0 \leq \theta \leq \pi/2$.

With the color image sensing devices of above (1) and (2), the resolution up to $f_H = 1/P_H$ is obtained and moires are less generated. To achieve the above object, a color image sensing device according to still another embodiment of the present invention is constituted as follows. Specifically, the color image sensing device comprises the following components a, b and c:

a. an image sensor having the offset sampling structure in which the horizontal pixel pitch is $P_H$, the vertical pixel pitch is $P_V$ and the horizontal pixel offset amount is $P_H/2$;

b. a color filter array comprising three or more types of color filters, provided for the above image sensor, and having the offset sampling structure in which those types of color filters are each arranged with the horizontal pitch of $2P_H$, the vertical pitch of $2P_V$ and the horizontal offset amount of $P_H$; and c. an optical low-pass filter disposed in an image sensing optical system and comprising a first optical member for dividing an incident light beam into twos spaced through a distance $P_1$ in a direction turned by +45° or −45° counterclockwise relative to the horizontal scanning direction of the image sensor and a second optical member for dividing an incident light beam into twos spaced through a distance $P_2$ in a direction turned by 90° relative to the beam dividing direction of the first optical member, the optical low-pass filter meeting the conditions below;

$$\frac{2.12P_HP_V}{P_H + 2P_V} < P_1 < \frac{3.54P_HP_V}{P_H + 2P_V}$$

$$\frac{2.12P_HP_V}{P_H + 2P_V} < P_2 < \frac{3.54P_HP_V}{P_H + 2P_V}$$

With the color image sensing device thus constituted, color carriers generated by the color filter array are removed by the optical low-pass filter and the occurrence of color moires is suppressed.

To achieve the above object, a color image sensing device according to still another embodiment of the present invention is constituted as follows.

Specifically, the color image sensing device comprises the following components a, b and c:

a. an image sensor having the offset sampling structure in which the horizontal pixel pitch is $P_H$, the vertical pixel pitch is $P_V$ and the horizontal pixel offset amount is $P_H/2$;

b. a color filter array comprising three or more types of color filters, provided for the above image sensor, and having the offset sampling structure in which those types of color filters are each arranged with the horizontal pitch of $2P_H$, the vertical pitch of $2P_V$ and the horizontal offset amount of $P_H$; and c. an optical low-pass filter disposed in an image sensing optical system and comprising a first optical member for dividing an incident light beam into twos spaced through a distance $P_1$ in a direction turned by +45° or −45° counterclockwise relative to the horizontal scanning direction of the image sensor, a second optical member for dividing an incident light beam into twos spaced through a distance $P_2$ in a direction parallel to the horizontal scanning direction and a third optical member for dividing an incident light beam into twos spaced through a distance $P_3$ in a direction turned by 90° relative to the beam dividing direction of the first optical member, the optical low-pass filter meeting the conditions below;

$$\frac{2.12P_HP_V}{P_H + 2P_V} < P_1 < \frac{3.54P_HP_V}{P_H + 2P_V}$$

$$0.375P_H < P_2 < 0.625P_H$$

$$\frac{2.12P_HP_V}{P_H + 2P_V} < P_3 < \frac{3.54P_HP_V}{P_H + 2P_V}$$

With the color image sensing device thus constituted, color carriers generated by the color filter array are removed by the optical low-pass filter and the occurrence of color moires is suppressed.

Other objects and features of the present invention will be apparent from the following detailed description and the attached drawings.

BRIEF DESCRIPTION OF THE DRAWINGS

FIGS. 40 and 41 are diagrams showing image patterns which are liable to generate false colors;

FIG. 44 is a table for explaining operation of the thirteenth embodiment; and

FIG. 45 is a table for explaining operation of the thirteenth embodiment.

DETAILED DESCRIPTION OF THE PREFERRED EMBODIMENTS

Hereinafter, the present invention will be described in detail in connection with preferred embodiments.

Figure 7:
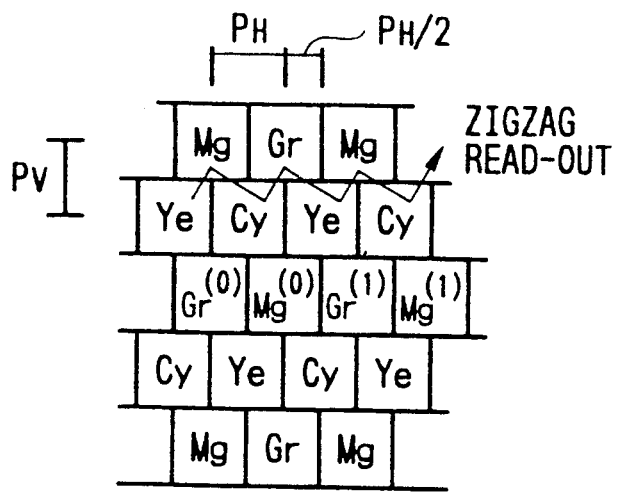
FIG. 7 is a diagram showing an arrangement of color filters used in a first embodiment of the present invention.

FIG. 7 shows an arrangement of color filters in a color image sensing device according to a first embodiment of the present invention. As will be seen from FIG. 7, a solid-state image sensor has the offset sampling structure in which the horizontal pixel pitch is $P_H$, the vertical pixel pitch is $P_V$ and the horizontal pixel offset amount is $P_H/2$. The image sensor is associated with a color filter array of the type that Magenta, green, cyan and yellow light transmissive filters Mg, Gr, Cy, Ye are arranged at positions corresponding to pixels in one-to-one relation.

In the offset sampling structure, those color filters are each arranged with the horizontal pitch of $2P_H$, the vertical pitch of $2P_V$ and the horizontal offset amount of $P_H$.

Figure 8:
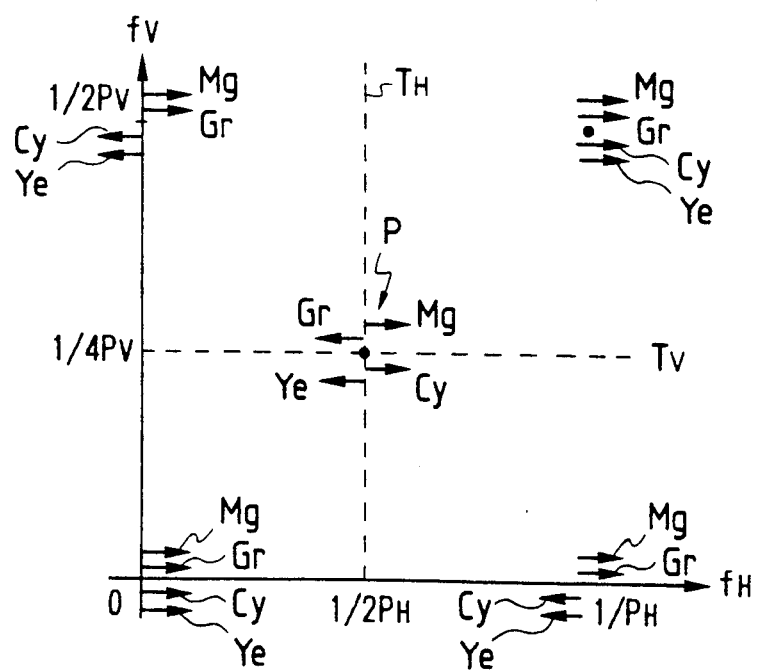
FIG. 8 is a characteristic diagram of color light carriers in the color filter arrangement of FIG. 7.

FIG. 8 is a characteristic diagram representing color light carriers in the above color filter arrangement using the two-dimensional frequency plane ($f_H$, $f_V$) over an area of $0 \leq f_H \leq 1P_H$ and $0 \leq f_V 1\frac{1}{2} P_V$ in the first quadrant. In FIG. 8, the color light carriers occur at $(1/P_H, 0)$, $(\frac{1}{2}P_H, \frac{1}{2}P_V)$, $(0, \frac{1}{2}P_V)$ and $(1/P_H, \frac{1}{2}P_V)$ other than $(0, 0)$. Among them, $(0, 0)$ and $(1/P_H, 0)$ represent the carriers which occur for achromatic light and the remaining carriers are disappeared for achromatic light.

As will be apparent from FIG. 8, no color light carriers occur until the position of $(1/P_H, 0)$ in the horizontal direction. Accordingly, the frequency component up to $f_H = 1/P_H$ can be obtained. In other words, the color image sensing device of this embodiment can produce the horizontal resolution as high as $f_H = 1/P_H$ which is 1.5 times that obtainable with the color image sensing device having the sampling structure of the prior art.

The color light carrier nearest to the origin is given by $(\frac{1}{2}P_H, \frac{1}{2}P_V)$, but it is sufficiently spaced from the origin and is also disappeared for achromatic light. Therefore, that carrier will not cause a significant turnback distortion for both the horizontal and vertical frequency components.

Thus, with the color image sensing device of this embodiment, high resolution is obtained and moires are less caused.

Figure 1:
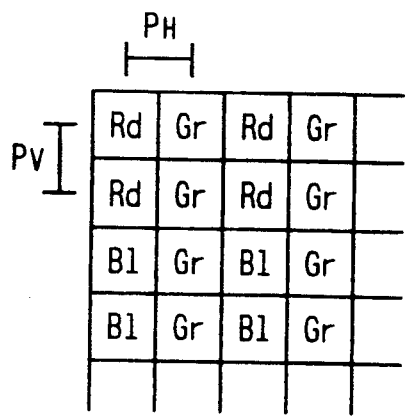
FIG. 1 is a diagram showing one example of arrangement of color filters.
Figure 2:
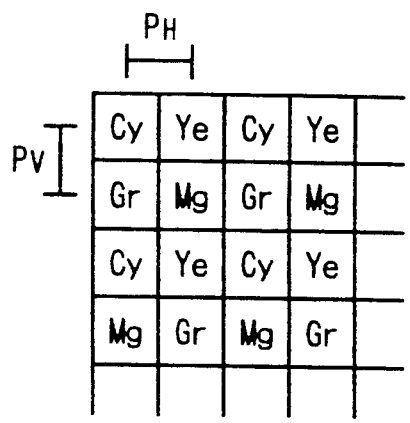
FIG. 2 is a diagram showing another example of arrangement of color filters.
Figure 9:
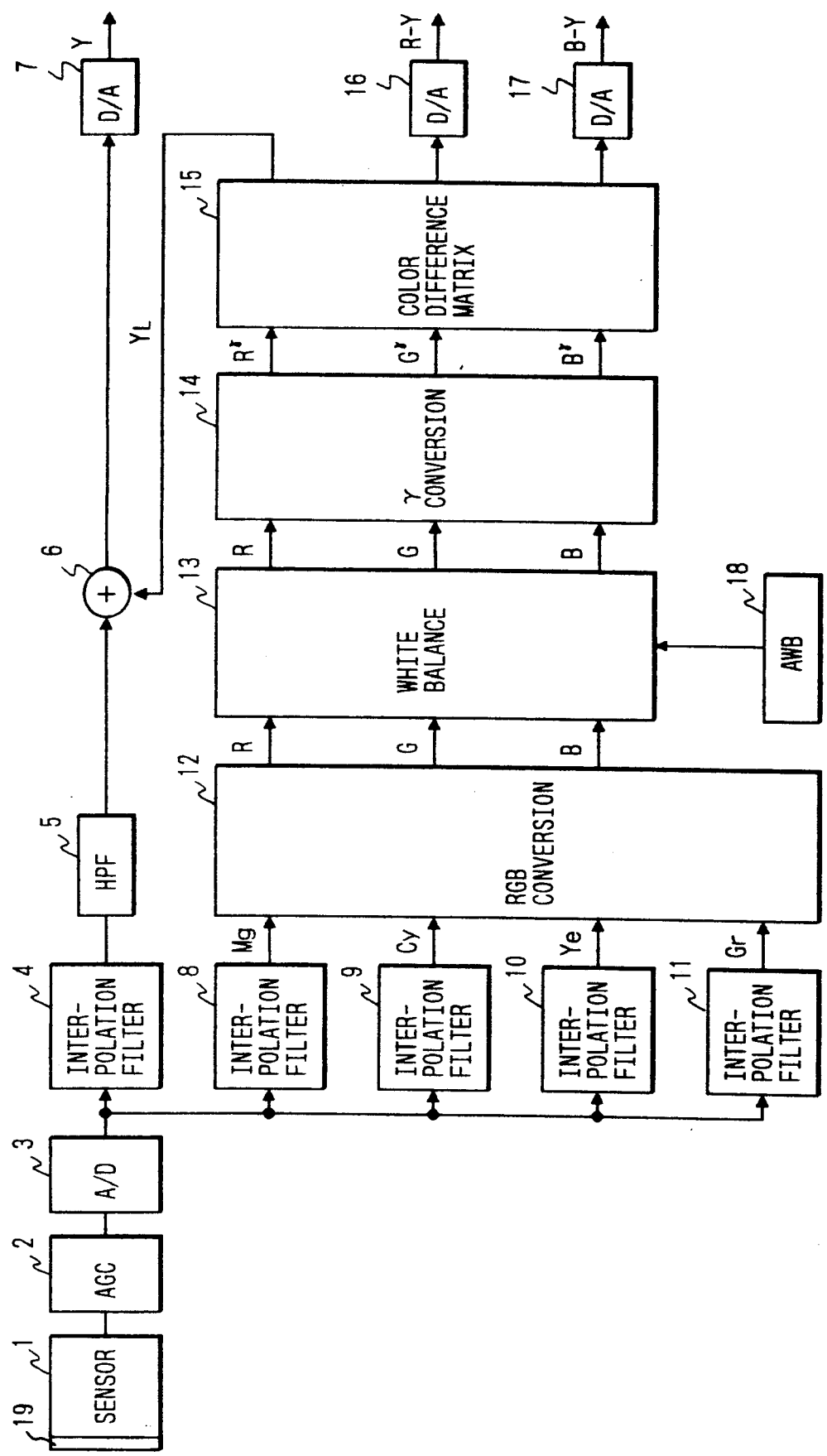
FIG. 9 is a block diagram of the first embodiment.

Signal processing in the color image sensing device which has the color filter arrangement shown in FIG. 1 will be next described. FIG. 9 is a block diagram for the signal processing.

A CCD sensor 1 as a solid-state image sensor is associated with a color filter array 19 comprising four types of color filters shown in FIG. 7. A video signal read out of the sensor 1 pixel by pixel is subjected to gain adjustment by an AGC 2 and, thereafter, to A/D conversion by an A/D (analog-to-digital) converter 3 at the timing synchronized to the read-out clock. The A/D converter 3 preferably has linear characteristics for the purpose of color processing to be carried out later, and the A/D conversion is desirably performed using 8 or more bits from the stand-point of errors in quantization.

A resulting luminance signal is passed through an interpolation filter 4 for two-dimensionally interpolate the offset sampling structure and a high-pass filter (HPF) 5 for detection of the higher-frequency luminance component thereof. The detected component is added in an adder 6 with the lower-frequency luminance component $Y_L$ obtained by the later-described technique and, thereafter, a summation signal is subjected to D/A (digital-to-analog) conversion by a D/A converter 7 and then outputted therefrom.

On the other hand, the output of the A/D converter 3 is also applied to four interpolation filters 8, 9, 10 and 11 which respectively output color signals Mg, Cy, Ye and Gr at the synchronized timing.

Note that by controlling the sequence of horizontal lines applied to the interpolation filters 8, 9, 10 and 11 in accordance with the clock, it is possible to obtain both an output signal based on interlace scan and an output signal based on non-interlace scan.

The synchronized color signals from the interpolation filters 8 to 11 are inputted to an RGB conversion unit 12 for conversion into three signals R, G, B. This conversion is performed through matrix operation below.

$$\begin{bmatrix} R \\ G \\ B \end{bmatrix} = A = \begin{bmatrix} Mg \\ Gr \\ Cy \\ Ye \end{bmatrix} \quad (1)$$

Here, the matrix A is a matrix of 3 row and 4 column optimized to make spectroscopic characteristics $Mg(\lambda)$, $Gr(\lambda)$, $Cy(\lambda)$, $Ye(\lambda)$ of the sensor 1 for Mg, Gr, Cy, Ye approach ideal spectroscopic characteristics $Mg(\lambda)$, $Gr(\lambda)$, $Cy(\lambda)$ for RGB specified in the NTSC system. Let it be now assumed that:

$$A = (a_{ij}) \quad (2)$$

$(i=1, 2, 3; j=1, 2, 3, 4)$

If the gain is adjusted to be constant for a monochromatic object, the base band components of Mg, Gr, Cy, Ye can be expressed below by using some function $\alpha(f_H, f_V)$ on the frequency space:

$$Mg(f_H, f_V) = Gr(f_H, f_V) = Ye(f_H, f_V) = Cy(f_H, f_V) = \alpha(f_H, f_V) \quad (3)$$

It is here supposed that the base band components of respective colors are sufficiently limited in band by two-dimensional filters such as the interpolation filters 8 to 11. In this case, the carrier components of the color signals at the position $(\tfrac{1}{2}P_H, \tfrac{1}{2}P_V)$ in FIG. 8 are expressed below:

$$Mg(f_H, f_V) = Cy(f_H, f_V) = \alpha(f_H, f_V),$$

$$Gr(f_H, f_V) = Ye(f_H, f_V) = \alpha(f_H, f_V) \quad (4)$$

Therefore, the carrier components of the RGB signals at that position are expressed below from Equations (1), (2), (3) and (4).

$$R(f_H, f_V) = (a_{11} - a_{12} + a_{13} - a_{14})\alpha(f_H, f_V),$$

$$G(f_H, f_V) = (a_{21} - a_{22} + a_{23} - a_{24})\alpha(f_H, f_V),$$

$$B(f_H, f_V) = (a_{31} - a_{32} + a_{33} - a_{34})\alpha(f_H, f_V) \quad (5)$$

At this time, if for each row of the matrix A the sum of coefficients of the first and third columns is equal to the sum of coefficients of the second and fourth columns, i.e., if the relationship of:

$$a_{i1} + a_{i3} = a_{i2} + a_{i4}$$

$(i=1, 2, 3) \quad (6)$ holds, the carrier components of the RGB signals at the point $(\tfrac{1}{2}P_H, \tfrac{1}{2}P_V)$ are reduced and, as result, there occur no carrier components of the color signals at that point. Likewise, the carrier components of the color signals at the point $(-\tfrac{1}{2}P_H, -\tfrac{1}{2}P_V)$ in the third quadrant, symmetrical to the point $(\tfrac{1}{2}P_H, \tfrac{1}{2}P_V)$ about the origin in FIG. 8, can also be disappeared by making the relationship of Equation (6) satisfied.

Figure 10:
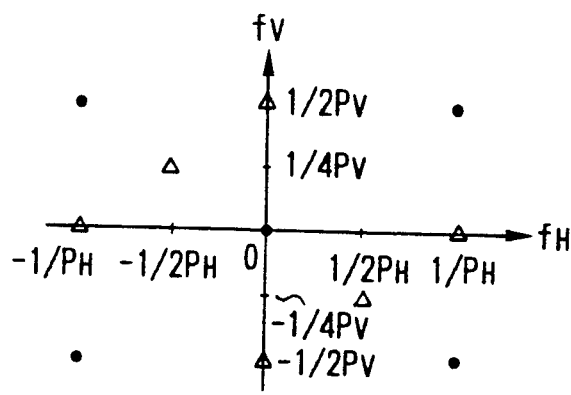
FIG. 10 is a diagram for explaining characteristics of the first embodiment.

FIG. 10 shows the positions at which the carriers of the luminance signal and the color signals occur near the origin. Because of disappearance of the carriers at $(+\tfrac{1}{2}P_H, \tfrac{1}{2}P_V)$ (double signs being effective for the same order), turn-back distortions to the base bands become smaller than the case of not meeting the relationship of Equation (6).

As explained above, the RGB conversion unit shown in FIG. 9 converts the color signals Mg, Gr, Cy, Ye into the RGB signals while reducing turn-back distortions.

Then, in a white balance unit 13, the RGB signals are converted from R, G, B into $\alpha R$, G, $\beta B$ based on color temperature information obtained by a white balance sensor 18, thereby making white balance.

After that, in a $\gamma$ conversion unit 14, the RGB signals are subjected to $\gamma$ conversion through table conversion. In a color difference matrix unit 113, the following conversion in conformity with the NTSC system is performed for producing the aforesaid lower-frequency luminance component $Y_L$ and color difference signals R-Y, B-Y;

$$\begin{bmatrix} Y_L \\ R - Y \\ B - Y \end{bmatrix} = \begin{bmatrix} 0.30 & 0.59 & 0.11 \\ 0.70 & -0.59 & -0.11 \\ -0.30 & -0.59 & 0.89 \end{bmatrix} \begin{bmatrix} R^\gamma \\ G^\gamma \\ B^\gamma \end{bmatrix}$$

The color difference signals R-Y, B-Y are subjected to D/A conversion by subsequent D/A converters 16, 17, respectively, and then outputted therefrom. The lower-frequency luminance component $Y_L$ is added with the higher-frequency luminance component detected by the high-pass filter 5 as mentioned above, following which the summation signal is subjected to D/A conversion by a D/A converter 7 and then outputted therefrom.

In this embodiment, the above signal processing system may be hard-wired according to the block diagram, or it may be implemented in the form of software using a DSP (digital signal processor) or the like.

A second embodiment of the present invention will be next described.

Figure 11:
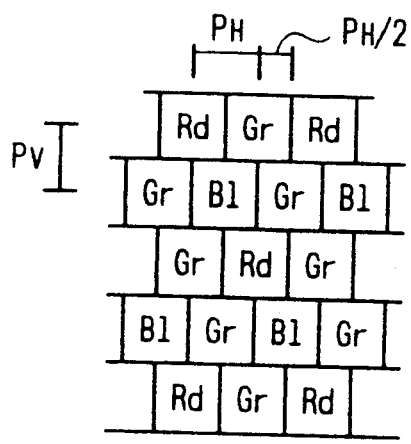
FIG. 11 is a diagram showing an arrangement of color filters used in a second embodiment of the present invention.
Figure 12:
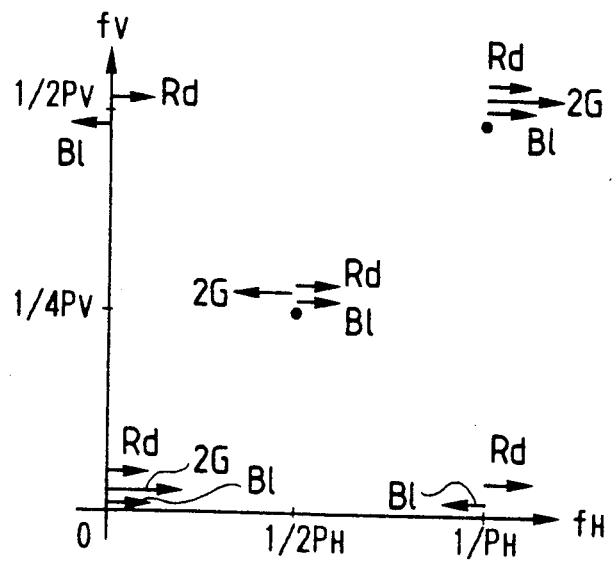
FIG. 12 is a characteristic diagram of color light carriers in the color filter arrangement of FIG. 11.

FIG. 11 shows an arrangement of color filters making up a color filter array used in a color solid-state image sensing device according to a second embodiment of the present invention. As with the first embodiment, a solid-state image sensor of this embodiment has the offset sampling structure in which the horizontal pixel pitch is $P_H$, the vertical pixel pitch is $P_V$ and the horizontal pixel offset amount is $P_H/2$. Color filters, i.e., red, green and blue light transmissive filters Rd, Gr, Bl are arranged at positions corresponding to pixels in one-to-one relation. In the color filter array, as shown in FIG. 10, the color filters Rd and Bl are each arranged with the offset sampling structure having the horizontal pitch of $2P_H$, the vertical pitch of $2P_V$ and the horizontal offset amount of $P_H$. On the other hand, while the color filter Gr is arranged in the form of oblique stripes, this arrangement can be regarded as that two arrays of the offset sampling structure having the horizontal pitch of $2P_H$, the vertical pitch of $2P_V$ and the horizontal offset amount of $P_H$ are superposed with shifts of $P_H/2$ in the horizontal direction and $P_V$ in the vertical direction relative each other. FIG. 12 is a characteristic diagram representing color light carriers in the above color filter arrangement using the two-dimensional frequency plane ($f_H$, $f_V$) over an area of $0 < f_H < 1/P_H$ and $0 < f_V < \frac{1}{2}P_V$ in the first quadrant.

In FIG. 12, the color light carriers occur at $(1/P_H, 0)$, $(\frac{1}{2}P_H, \frac{1}{2}P_V)$, $(0, \frac{1}{2}P_V)$ and $(1/P_H, \frac{1}{2}P_V)$ other than $(0, 0)$. Among them, $(0, 0)$ and $(1/P_H, 0)$ represent the carriers which occur for achromatic light and the remaining carriers are disappeared for achromatic light. This is similar to the first embodiment.

Accordingly, also in this embodiment, the horizontal resolution as high as $f_H = 1/P_H$ can be obtained. In addition, no significant turn-back distortion occurs for both the horizontal and vertical frequency components.

Figure 13:
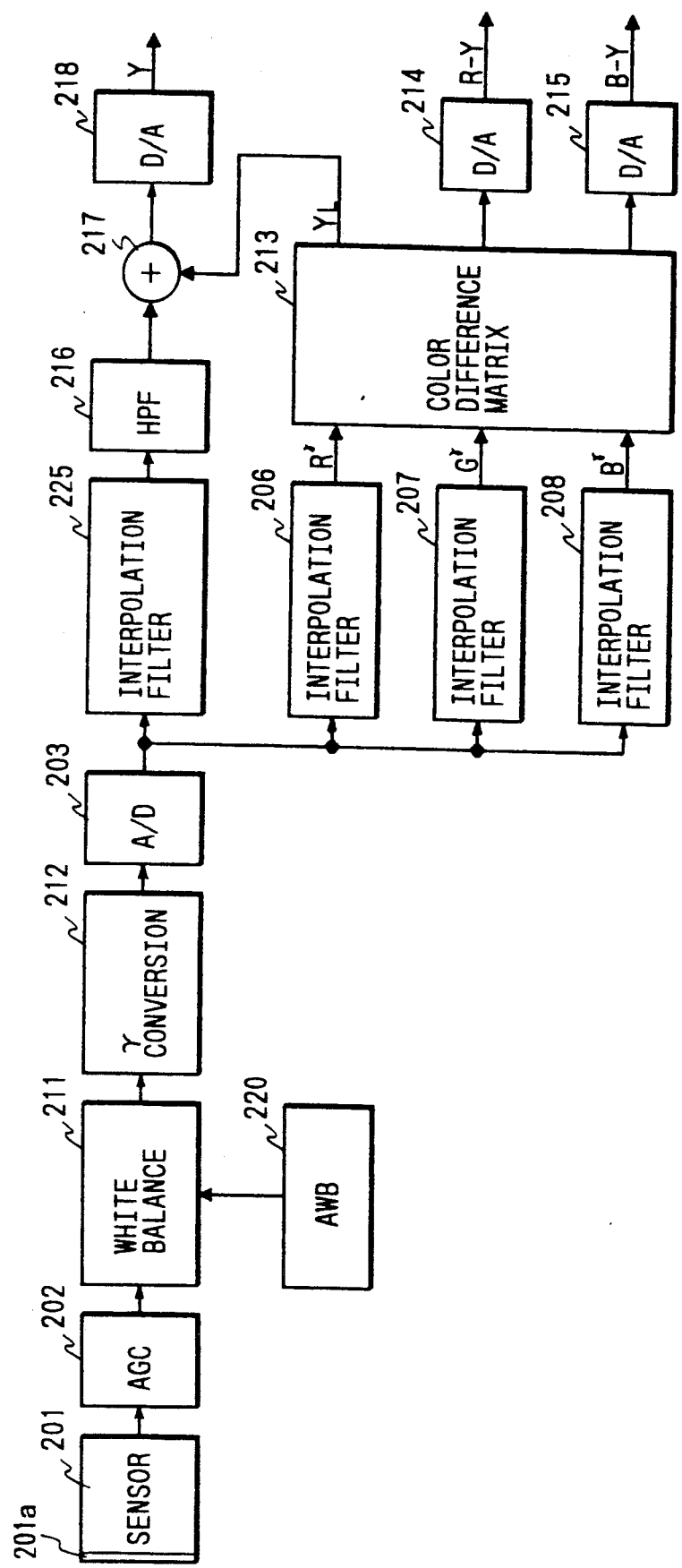
FIG. 13 is a block diagram of the second embodiment.

Signal processing in the color solid-state image sensing device which has the color filter arrangement shown in FIG. 11 will be next described by referring to FIG. 13.

A CCD sensor 201 is associated with a color filter array 201a comprising three types of color filters shown in FIG. 11. A video signal read out of the sensor 201 pixel by pixel is subjected to gain adjustment by an AGC 202 and, thereafter, gains of RGB signals are adjusted in a white balance unit 211 based on color temperature information obtained by a white balance sensor 220, thereby making white balance. After that, the RGB signals are subjected to γ conversion in a γ conversion unit 212, and then to A/D conversion by an A/D converter 203 at the timing synchronized to the read-out clock.

A resulting luminance signal is passed through an interpolation filter 225 for two-dimensionally interpolating the offset sampling structure and then a high-pass filter (HPF) 216 for detection of the higher-frequency luminance component thereof. The detected component is added in an adder 217 with the lower-frequency luminance component $Y_L$ obtained by the later-described technique and, thereafter, a summation signal is subjected to D/A conversion by a D/A converter 218 and then outputted therefrom.

On the other hand, the output of the A/D converter 203 is also applied to three interpolation filters 206, 207 and 208 which respectively output color signals R, G and B at the synchronized timing.

Note that by controlling the sequence of horizontal lines applied to the interpolation filters 206, 207, 208 and 225 in accordance with the clock, it is possible to obtain both an output signal based on interlace scan and an output signal based on non-interlace scan.

The synchronized color signals from the interpolation filters 206, 207 and 208 are inputted to a color difference matrix unit 213 for conversion in conformity with the NTSC according to the equation (1), to thereby produce the lower-frequency luminance component $Y_L$ and color difference signals R-Y, B-Y. The color difference signals R-Y, B-Y are subjected to D/A conversion by subsequent D/A converters 214, 215, respectively, and then outputted therefrom. The lower-frequency luminance component $Y_L$ is added with the higher-frequency luminance component detected by the high-pass filter 216 as mentioned above, following which the summation signal is subjected to D/A conversion by a D/A converter 218 and then outputted therefrom.

In this embodiment, too, the above signal processing system may be hard-wired according to the block diagram, or it may be implemented in the form of software using a DSP or the like.

While the above embodiments have been explained in connection with still picture recording, the present invention is not limited thereto and can also be practiced in motion picture recording such as represented by video cameras.

With this embodiment, as explained above, in spite of using the sampling structure in which the horizontal pixel pitch is $P_H$ and the vertical pixel pitch is $P_V$, no detrimental carriers occur over a wide range along the horizontal frequency axis, and the horizontal resolution as high as the frequency of $f_H = 1/P_H$. It is thus possible to provide the color image sensing device which has high resolution and causes fewer moires.

Figure 14:
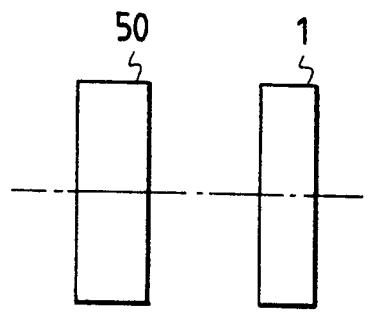
FIG. 14 is a diagram showing layout of an optical low-pass filter for use in a third embodiment of the present invention.

Meanwhile, as stated before, in the color image sensing device of the first embodiment there occur carrier components responsible for turn-back distortions at such positions as shown in FIG. 10. In order to minimize the turn-back distortions in that type color image sensing device, an optical low-pass filter 50 is required to be located forwardly of the sensor 1, as shown in FIG. 14, to thereby trap positions in the vicinity of the carriers $(\mp \frac{1}{2}P_H, \pm \frac{1}{2}P_V)$ (double signs being effective for the same order), which are closest to the origin, for suppressing the turn-back distortions.

Figure 15:
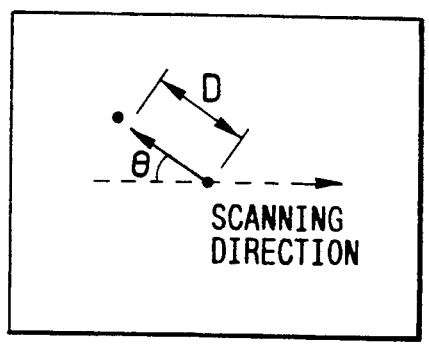
FIG. 15 is a diagram for explaining the construction of the optical low-pass filter in the third embodiment.

A color image sensing device comprising the image sensing optical system of the first embodiment and such as additional optical low-pass filter will be described below as a third embodiment of the present invention. The optical low-pass filter 50 functions to, as shown in FIG. 15, divide an incident light beam into twos spaced through a distance D in a direction turned by an angle θ clockwise relative to the reversed scanning direction, while meeting the conditions below:

$$\frac{1.6 P_H P_V}{|P_H \sin\theta + 2P_V \cos\theta|} \leq D \leq \frac{2.4 P_H P_V}{|P_H \sin\theta + 2P_V \cos\theta|} \quad (7)$$

where
$$0 \leq \theta \leq \pi/2 \quad (8)$$

If the value of D exceeds a lower limit of Inequality (7), the turn-back distortions would be increased and, if it exceeds an upper limit of Inequality (7), the resolution would be decreased. Thus, any case would lead to the unsatisfactory result.

In this embodiment, $\theta$ and D are set as follows:

$$\theta = \tan^{-1}(2P_V/P_H), \quad D = \frac{2P_H P_V}{|P_H\sin\theta + 2P_V\cos\theta|} \quad (9)$$

Figure 16:
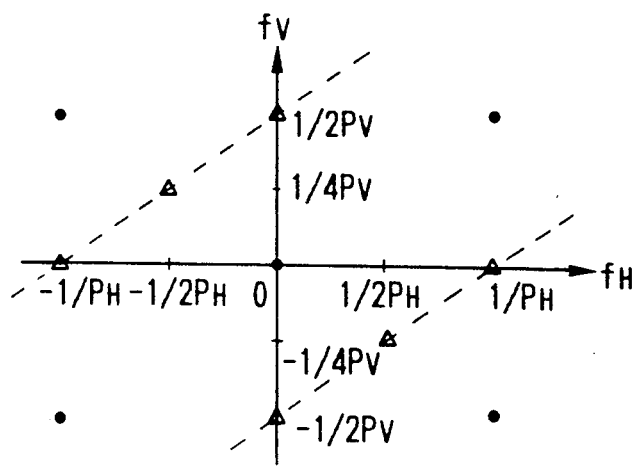
FIG. 16 is a characteristic diagram of the optical low-pass filter in the third embodiment.

By so setting, the optical low-pass filter 50 traps such positions as indicated by dot lines in FIG. 16. Therefore, the carriers of the color signals are located at not only ($\mp\frac{1}{2}P_H$, $\pm\frac{1}{4}P_V$) (double signs being effective for the same order), but also ($\pm 1/P_H$, 0) and (0, $\pm\frac{1}{2}P_V$), making it possible to minimize the turn-back distortions caused by the color signals and thus provide the satisfactory image quality.

The exact same characteristics as the above can also be obtained in the case of setting the beam dividing direction of the optical low-pass filter 50 in a direction symmetrical to the direction shown in FIG. 15 about a point, i.e., in a direction turned by an angle $\theta$ clockwise relative to the scanning direction. The optical low-pass filter 50 can be made of a double refracting plate using a uniaxial crystal such as quartz. Other than this example, the filter 50 may be in any form, including a prism, so long as it has a property to divide the incident light beam into twos.

Figure 17:
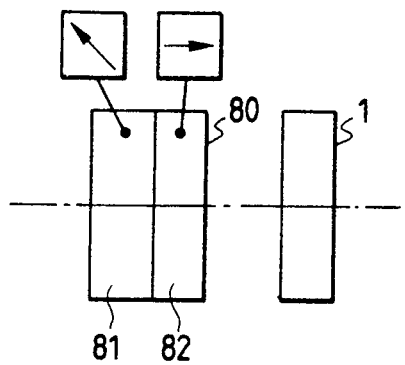
FIG. 17 is a diagram showing a modification of the optical low-pass filter in the third embodiment.
Figure 18:
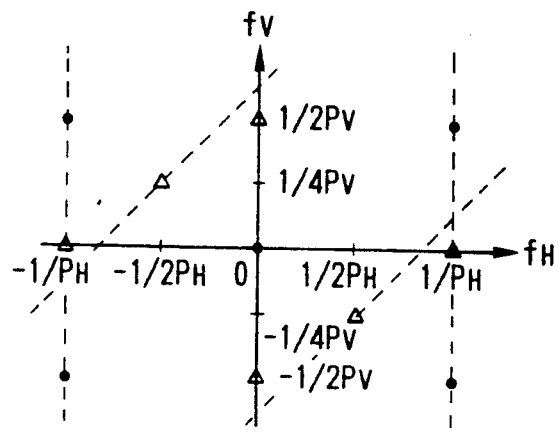
FIG. 18 is a characteristic diagram of the optical low-pass filter shown in FIG. 17.

Furthermore, as shown in FIG. 17, there can also be employed, as a modification of the third embodiment, an optical low-pass filter 80 in combination of an optical low-pass filter 81 which is made of a double refracting plate and divides an incident light beam into twos spaced through a distance D below in a direction turned by an angle 45° clockwise relative to the reversed scanning direction;

$$D = \frac{2\sqrt{2} P_H P_V}{P_H + 2P_V}$$

and an optical low-pass filter 82 which is made of a double refracting plate for dividing an incident light beam into twos spaced through a distance $P_H/2$ parallel to the scanning direction. In this case, spatial frequency characteristics of the optical low-pass filter 80 trap such positions as indicated by dot lines in FIG. 18. Therefore, not only the carriers of the color signals located at ($\mp\frac{1}{2}P_H$, $\pm\frac{1}{4}P_V$) (double signs being effective for the same order) are trapped, but also the carriers of the color signals located at ($\pm 1/P_H$, 0) and (0, $\pm\frac{1}{2}P_V$) are trapped in their vicinity, making it possible to achieve a sufficient degree of suppression. In addition, since the carriers of the luminance signal located at ($\pm 1/P_H$, $\pm\frac{1}{2}P_V$) (double signs being effective regardless of the order) are further trapped, there can be obtained images in which the turn-back distortions are satisfactorily suppressed.

A fourth embodiment of the present invention will be next described. This embodiment is different from the first embodiment only in the matrix for use with the RGB conversion unit.

Figure 19:
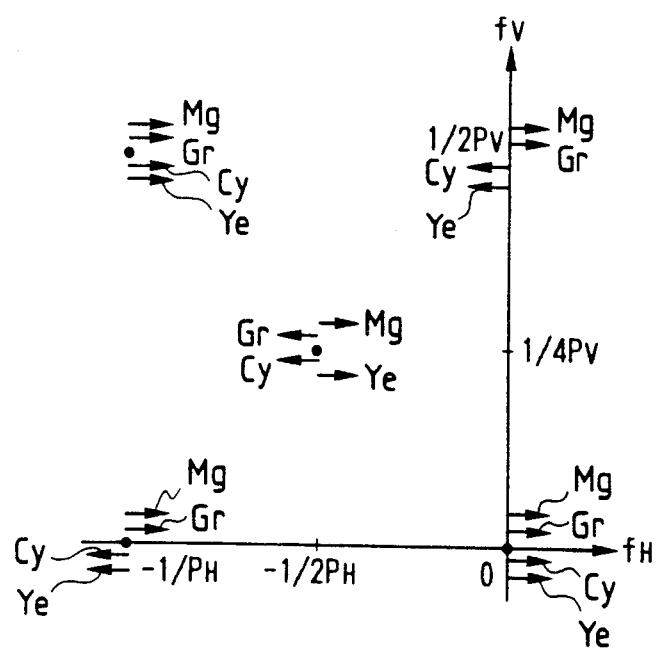
FIG. 19 is a diagram showing two-dimensional frequency characteristics (in the second quadrant) of color light carriers in the color filter arrangement of FIG. 7.

FIG. 19 is a characteristic diagram representing color light carriers in the color solid-state image sensor of FIG. 7 using the two-dimensional frequency plane ($f_H$, $f_V$) in the second quadrant. In FIG. 19, the color light carriers occur at ($-1/P_H$, 0), ($-\frac{1}{2}P_H$, $\frac{1}{4}P_V$), (0, $\frac{1}{2}P_V$) and ($-1/P_H$, $\frac{1}{2}P_V$) other than (0, 0). Among them, (0, 0) and ($-1/P_H$, $\frac{1}{2}P_V$) represent the carriers which occur for achromatic light and the remaining carriers which occur for chromatic light. The above carrier positions are symmetrical to those shown in FIG. 8 about the $f_V$ axis except for carrier signs of the respective colors only at ($-\frac{1}{2}P_H$, $\frac{1}{4}P_V$).

When converting the color signals Mg, Gr, Cy, Ye into the RGB signals in the RGB conversion unit 110 shown in FIG. 9, the carrier components of the color signals at the position ($-\frac{1}{2}P_H$, $\frac{1}{4}P_V$) in FIG. 19 are expressed below using Equation (3):

$$Mg(f_H, f_V) = Ye(f_H, f_V) = \alpha(f_H, f_V), \ Gr(f_H, f_V) = Cy(f_H, f_V) = \alpha(f_H, f_V) \quad (10)$$

Therefore, the carrier components of the RGB signals at that position are expressed below from Equations (1), (2), (3) and (10):

$$R(f_H, f_V) = (a_{11} - a_{12} - a_{13} + a_{14})\alpha(f_H, f_V), \quad (11)$$

$$G(f_H, f_V) = (a_{21} - a_{22} - a_{23} + a_{24})\alpha(f_H, f_V),$$

$$B(f_H, f_V) = (a_{31} - a_{32} - a_{33} + a_{34})\alpha(f_H, f_V)$$

At this time, if for each row of the matrix A the sum of coefficients of the first and fourth columns is equal to the sum of coefficients of the second and third columns, i.e., if the relationship of:

$$a_{i1} + a_{i4} = a_{i2} + a_{i3}$$

$$(i = 1, 2, 3) \quad (12)$$

holds, the carrier components of the RGB signals at the point ($-\frac{1}{2}P_H$, $\frac{1}{4}P_V$) are disappeared and, as a result, there occur no carrier components of the color signals at that point. Likewise, the carrier components of the color signals at the point ($\frac{1}{2}P_H$, $-\frac{1}{4}P_V$) in the fourth quadrant, symmetrical to the point ($-\frac{1}{2}P_H$, $\frac{1}{4}P_V$) about the origin in FIG. 19, can also disappear by satisfying the relationship of Equation (12).

Figure 20:
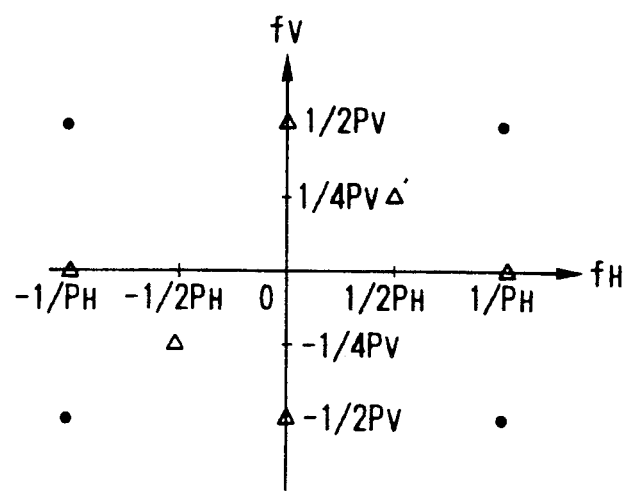
FIG. 20 is a diagram for explaining characteristics of a fourth embodiment.

FIG. 20 shows the positions at which the carriers of the luminance signal and the color signals occur near the origin.

In order to minimize the turn-back distortions in that type of color image sensing device, like the first embodiment, the optical low-pass filter 50 is required to be located forwardly of the sensor 1, as shown in FIG. 14, to thereby trap positions in the vicinity of the carriers ($\pm\frac{1}{2}P_H$, $\pm\frac{1}{4}P_V$) (double sings being effective for the same order), which are closest to the origin, for suppressing the turn-back distortions.

Figure 21:
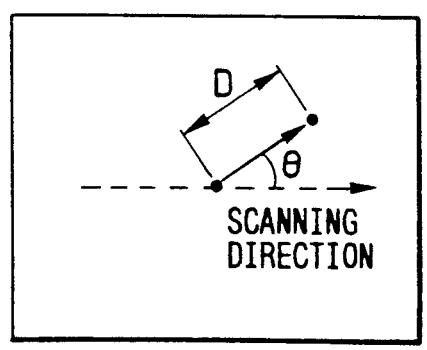
FIG. 21 is a diagram for explaining the construction of the optical low-pass filter used in a fifth embodiment of the present invention.

A color image sensing device comprising the image sensing optical system of the fourth embodiment and such as additional optical low-pass filter will be described below as a fifth embodiment of the present invention. The optical low-pass filter 50 functions to, as shown in FIG. 21, divide an incident light beam into twos spaced through a distance D in a direction turned by an angle $\theta$ counter-clockwise relative to the scanning direction, while meeting the conditions below:

$$\frac{1.6 P_H P_V}{|P_H\sin\theta + 2P_V\cos\theta|} \leq D \leq \frac{2.4 P_H P_V}{|P_H\sin\theta + 2P_V\cos\theta|} \quad (7)$$

where $$0 \leq \theta \leq \pi/2 \quad (8)$$

If the value of D exceeds a lower limit of Inequality (7), the turn-back distortions would be increased and, if it exceeds an upper limit of Inequality (7), the resolution would be decreased. Thus, exceeding the limits would lead to the unsatisfactory result in any case.

In this embodiment, $\theta$ and D are set as follows:

$$\theta = \tan^{-1}(2P_V/P_V),\ D = \frac{2P_H P_V}{|P_H \sin\theta + 2P_V \cos\theta|} \quad (9)$$

Figure 22:
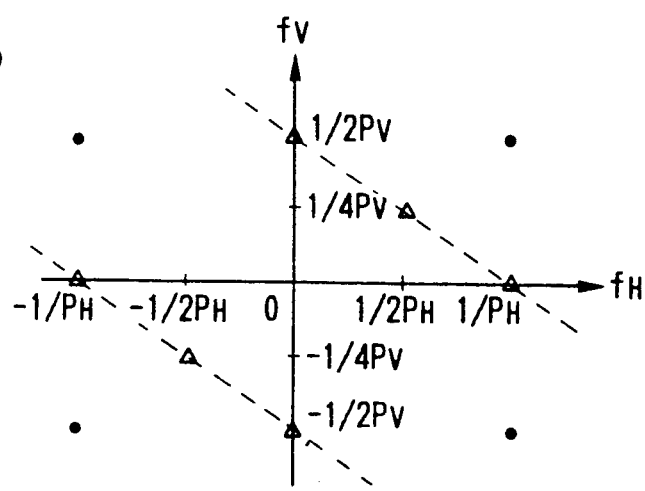
FIG. 22 is a characteristic diagram of the optical low-pass filter in the fifth embodiment.

By so setting, the optical low-pass filter 50 traps such positions as indicated by dot lines in FIG. 22. Therefore, the carriers of the color signals located at not only ($\pm\frac{1}{2}P_H$, $\pm\frac{1}{2}P_V$) (double signs being effective for the same order), but also ($\pm 1/P_H$, 0) and (0, $\pm\frac{1}{2}P_V$), making it possible to minimize the turn-back distortions caused by the color signals and thus provide the satisfactory image quality.

Figure 23:
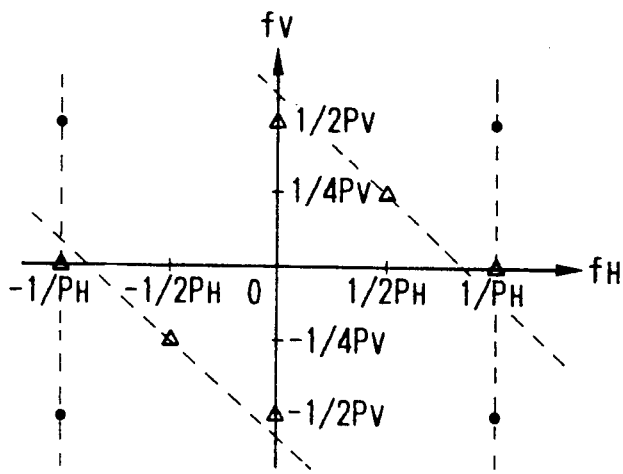
FIG. 23 is a characteristic diagram of a modification of the optical low-pass filter in the fifth embodiment.

The exactly same characteristics as the above can also be obtained in the case the setting the beam dividing direction of the optical low-pass filter 50 in a direction symmetrical to the direction shown in FIG. 21 about a point, i.e., in a direction turned by an angle $\theta$ counter-clockwise relative to the reversed scanning direction. The optical low-pass filter 50 can be made of a double refracting plate using an uniaxial crystal such as quartz. Other than this example, the filter 50 may be in any form, including a prism, so long as it has a property to divide the incident light beam into twos. In order to provide the same effect as the optical low-pass filter shown in FIG. 17, it is only required to use the optical low-pass filter 80 in combination with the optical low-pass filter 81 modified such that it is made of a double refracting plate for dividing an incident light beam into twos spaced through a distance D below in a direction turned by an angle 45° counter-clockwise relative to the scanning direction:

$$D = \frac{2\sqrt{2} P_H P_V}{P_H + 2P_V}$$

and the optical low-pass filter 82 which is made of a double refracting plate for dividing an incident light beam into twos spaced through a distance $P_H/2$ parallel to the scanning direction. In this case, spatial frequency characteristics of the optical low-pass filter 80 trap such positions as indicated by dot lines in FIG. 23. Therefore, not only the carriers of the color signals located at ($\pm\frac{1}{2}P_H$, $\pm\frac{1}{4}P_V$) (double signs being effective for the same order) are trapped, but also the carriers of the color signals located at ($\pm 1/P_H$, 0) and (0, $\pm\frac{1}{2}P_V$) are trapped in their vicinity making it possible to achieve a sufficient degree of suppression. In addition, since the carriers of the luminance signal located at ($\pm 1/P_H$, $\pm\frac{1}{2}P_V$) (double signs being effective regardless of the order) are further trapped, there can be obtained images in which the turn-back distortions are satisfactorily suppressed.

A sixth embodiment of the present invention will be next described.

The carrier components of the color signals at the positions (1/$P_H$, 0) and (0, $\frac{1}{2}P_V$) in FIG. 8 are expressed below using Equation (3):

$$Mg(f_H, f_V) = Gr(f_H, f_V) = \alpha(f_H, f_V),$$

$$Cy(f_H, f_V) = Ye(f_H, f_V) = \alpha(f_H, f_V) \quad (13)$$

Therefore, after conversion into the RGB signals by the RGB conversion unit 12 shown in FIG. 9, the carrier components of the RGB signals at those positions are expressed below from Equations (1), (2), (3) and (13):

$$R(f_H, f_V) = (a_{11} + a_{12} - a_{13} - a_{14})\alpha(f_H, f_V), \quad (14)$$

$$G(f_H, f_V) = (a_{21} + a_{22} - a_{23} - a_{24})\alpha(f_H, f_V),$$

$$B(f_H, f_V) = (a_{31} + a_{32} - a_{33} - a_{34})\alpha(f_H, f_V)$$

At this time, if for each row of the matrix A the sum of coefficients of the first and second columns is equal to the sum of coefficients of the third and fourth columns, i.e., if the relationship of;

$$a_{i1} + a_{i2} = a_{i3} + a_{i4}$$

$$(i = 1, 2, 3) \quad (15)$$

holds, the carrier components of the RGB signals at the points (1/$P_H$, 0) and (0, $\frac{1}{2}P_V$) disappear and, as a result, there occur no carrier components of the color signals at that point. Likewise, the carrier components of the color signals at the points ($-1/P_H$, 0) and (0, $-\frac{1}{2}P_V$), symmetrical to the point ($\frac{1}{2}P_H$, 0) and (0, $\frac{1}{2}P_V$) about the origin in FIG. 8, can also disappear by satisfying the relationship of Equation (15) satisfied.

Figure 24:
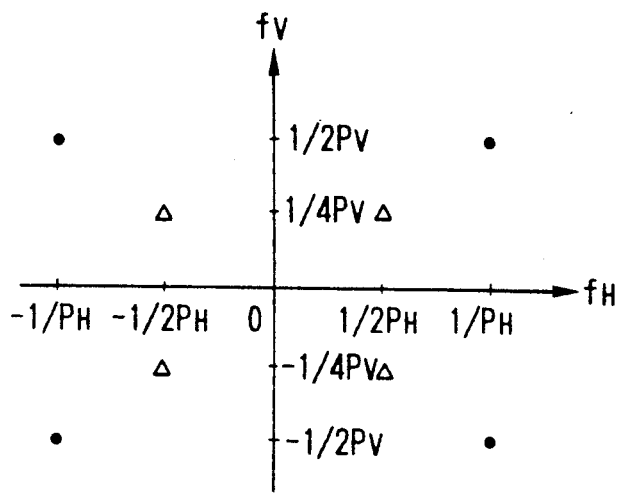
FIG. 24 is a diagram for explaining characteristics of a sixth embodiment of the present invention.

FIG. 24 shows the positions at which the carriers of the luminance signal and the color signals occur near the origin.

In order to minimize the turn-back distortions in that type color image sensing device, it is only required to combine the optical low-pass filter used in the third embodiment which has been dividing characteristics as shown in FIG. 15, with the optical low-pass filter used in the fifth embodiment which has beam dividing characteristics as shown in FIG. 21. In this case, the dividing distance in each of the optical low-pass filters is to meet the conditions given by Equation (7).

With this embodiment, as explained above, the horizontal resolution as high as the frequency of $f_H \leq 1/P_H$, making it possible to provide the color image sensing device which has high resolution and causes fewer moires.

A seventh embodiment of the present invention will be next described.

This embodiment is intended to provide a color image sensing device in which the image sensor using the color filter arrangement of such offset sampling structure as shown in FIG. 7 or 11 is combined with an optical low-pass filter effective in suppressing color moires.

In other words, this embodiment has been made by carefully analyzing the sampling structure used in the color filter arrangement shown in FIG. 7 or 11 from the two-dimensional aspect and, as a result, deriving conditions of the optical low-pass filter optimum for preventing color moires.

Figure 25:
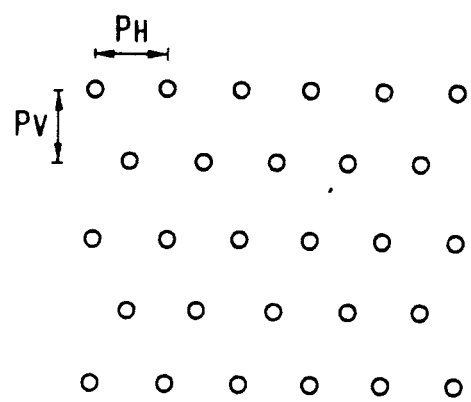
FIGS. 25 and 26 are diagrams for explaining the offset sampling structure.
Figure 26:
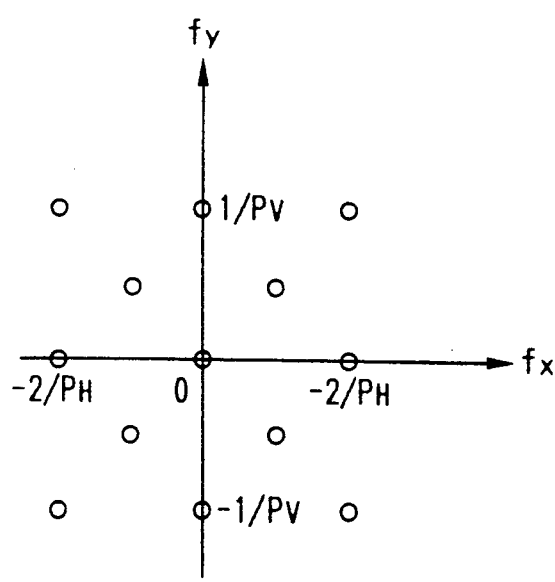

First, the offset sampling structure is considered in which the horizontal and vertical pitches are $P_H$ and $P_V$, respectively, and the horizontal offset amount is $P_H/2$, as shown in FIG. 25. It is known that the above sampling structure corresponds to, in terms of the two-dimensional frequency plane, the offset structure in which the horizontal and vertical pitches are 2/$P_H$ and 1/$P_V$, respectively, and the horizontal offset amount is 1/$P_H$2 as shown in FIG. 26. How to derive the latter from the former is described in, for example, a book by Takahiko Suisaka, "Digital Signal Processing of Image", Nikkan Kogyo Shinbunsha (1985), p. 317.

Figure 27:
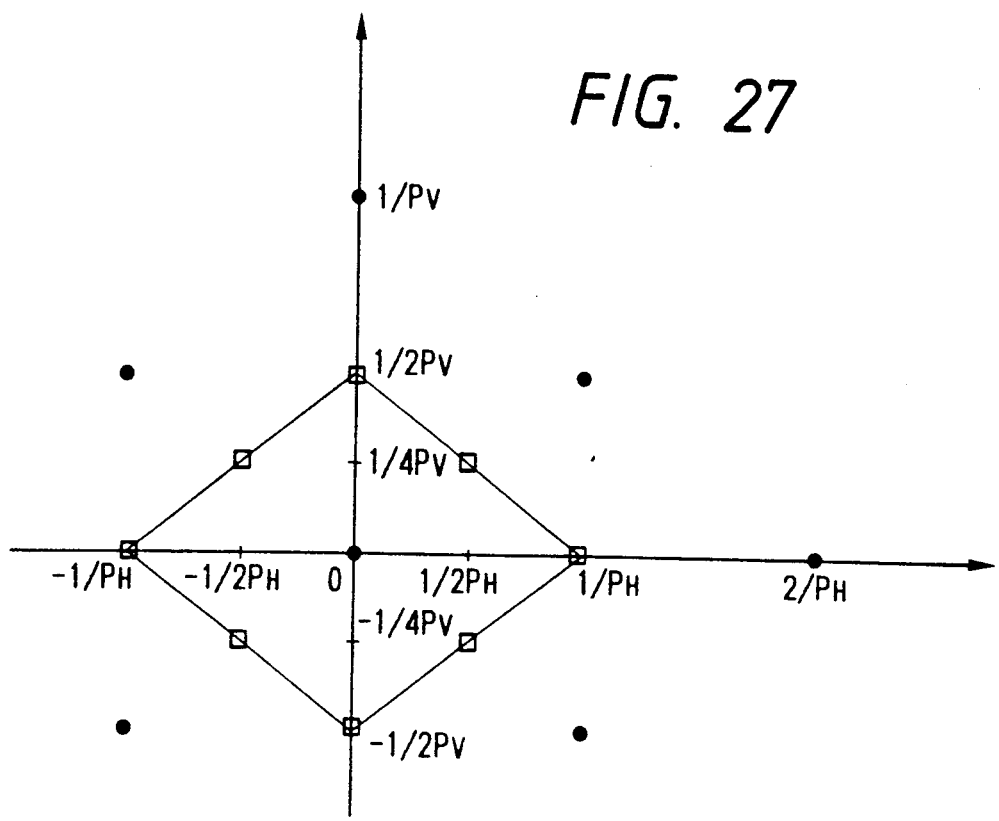
FIG. 27 is a diagram showing two-dimensional frequency characteristics of an ideal optical low-pass filter.

Accordingly, assuming that the luminance signal is obtained based on the so-called switch-Y method, by which the color signal from the color filter for each pixel is regarded equivalently as the luminance signal, in the image sensor using the color filter arrangement as shown in FIG. 7 or 11, the sampling structure of the luminance signal is represented by marks in FIG. 27. With regards to the color signals, it is found that Mg in FIG. 7, for example, also has the offset sampling structure in which the horizontal and vertical pitches are $2P_H$ and $2P_V$, respectively, and the horizontal offset amount is $P_H$. Therefore, the sampling structure of the color signals is represented by mark □ in FIG. 27.

As a result, an optical low-pass filter optimum for preventing color moires should be such that its frequency characteristics become zero or minimum near four sides of a rhombus indicated by solid lines in FIG. 27.

Thus, in view of the foregoing, this embodiment is directed to a color image sensing device which includes an optical filter optimum for the image sensor using the color filter arrangement as shown in FIG. 7 or 11.

The seventh embodiment will be described below in more detail. In the following description, the term "directions" indicates two opposite directions different from each other by 180° and the term "direction" indicates one direction.

Figure 28:
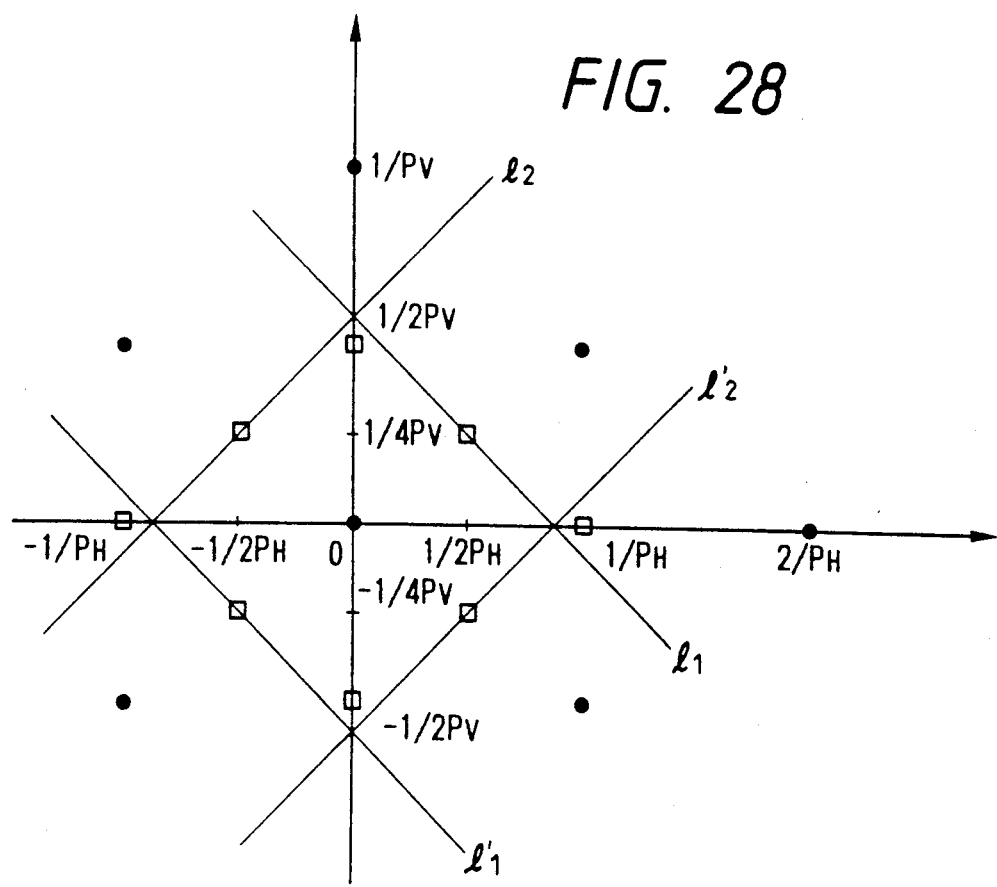
FIG. 28 is a diagram showing two-dimensional frequency characteristics of an optical low-pass filter used in a seventh embodiment of the present invention.

While ideal characteristics are rhombic as mentioned above, when constituting the optical low-pass filter by using a double refracting plate or the like in practice, it is easier to make frequency characteristics zero along four straight lines $l_1$, $l_1'$, $l_2$, $l_2'$ passing the color carrier frequencies $(\frac{1}{2}P_H, \frac{1}{4}PV)$, which are closest to the origin, the making angles 45° with respect to the fx axis, as indicated by solid lines in FIG. 28. For this purpose, the optical low-pass filter is required to comprise a first optical member for dividing an incident light beam into twos spaced through a distance $P_1$ in directions turned by an angle $+45°$ or $-45°$ counter-clockwise relative to the horizontal scanning direction, and a second optical member for dividing an incident light beam into twos spaced through a distance $P_2$ in directions making 90° relative to the beam dividing directions of the first optical member. In this case, the two-dimensional MTF value representing frequency characteristics of the optical low-pass filter is given by:

$$MTF(f_x, f_y) = \left| \cos\pi P_1 \frac{f_x + f_y}{\sqrt{2}} \cdot \cos\pi P_2 \frac{f_x - f_y}{\sqrt{2}} \right| \quad (1)$$

Thus, the MTF value changes in the form of a cosine function in directions making $\pm 45°$ relative to the horizontal and in the form of a square of cosine as a result of multiplication of two terms in the horizontal and vertical directions. Consequently, the turn-back distortions are satisfactorily suppressed in the horizontal, vertical and oblique directions.

To make the optical low-pass filter exhibit sufficient performance, it is desirable that the four straight lines shown in FIG. 28 pass near the points $(\pm\frac{1}{2}P_H, \pm\frac{1}{4}P_V)$. For this purpose, since the distances from the origin to the four straight lines are given by:

$l_1, l_1': \frac{1}{2}P_1$ $l_2, l_2': \frac{1}{2}P_2$ values of these distances are required to fall within a range of $\pm 25\%$ about $h_0$ below:

$$h_0 = \frac{1}{\sqrt{2}} \left( \frac{1}{2P_H} + \frac{1}{4P_V} \right)$$

Here, $h_0$ represents the distance from the origin to the four straight lines $l_1$, $l_1'$, $l_2$, $l_2'$ when these lines pass the points $(\pm\frac{1}{2}P_H, \pm\frac{1}{4}P_V)$. To this end, the separation (or division) widths $P_1$, $P_2$ are required to meet the following conditions:

$$\frac{2.12 P_H P_V}{P_H + 2P_V} < P_1 < \frac{3.54 P_H P_V}{P_H + 2P_V} \quad (2)$$

$$\frac{2.12 P_H P_V}{P_H + 2P_V} < P_2 < \frac{3.54 P_H P_V}{P_H + 2P_V} \quad (3)$$

In each equation, if the value exceeds an upper limit, the quantity of color moires would be increased and, if it exceeds a lower limit, the resolution of the entire system comprising the optical low-pass filter and the image sensor would be decreased. Thus, exceeding the limits would lead to the unsatisfactory result in any case.

Figure 29:
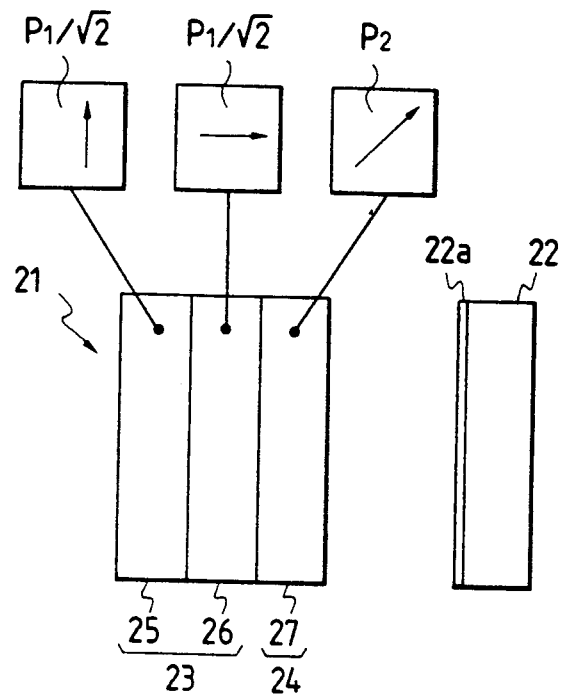
FIG. 29 is a diagram showing the construction of primary parts of the seventh embodiment.

FIG. 29 shows the construction of primary parts of the color image sensing device implementing the seventh embodiment of the present invention. In FIG. 29, denotes by 21 is an optical low-pass filter and 22 is a color image sensor having the offset sampling structure, the image sensor being associated with a color filter array 22a which has the color filter arrangement as shown in FIG. 7 or 11.

Figure 3:
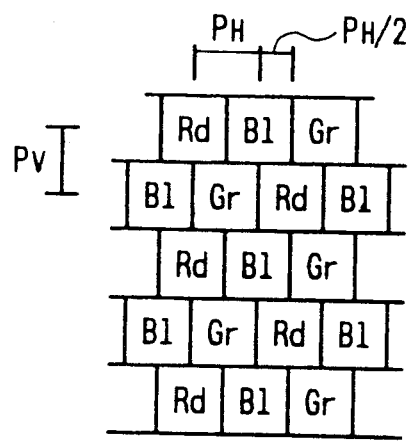
FIG. 3 is a diagram showing still another example of arrangement of color filters.
Figure 4:
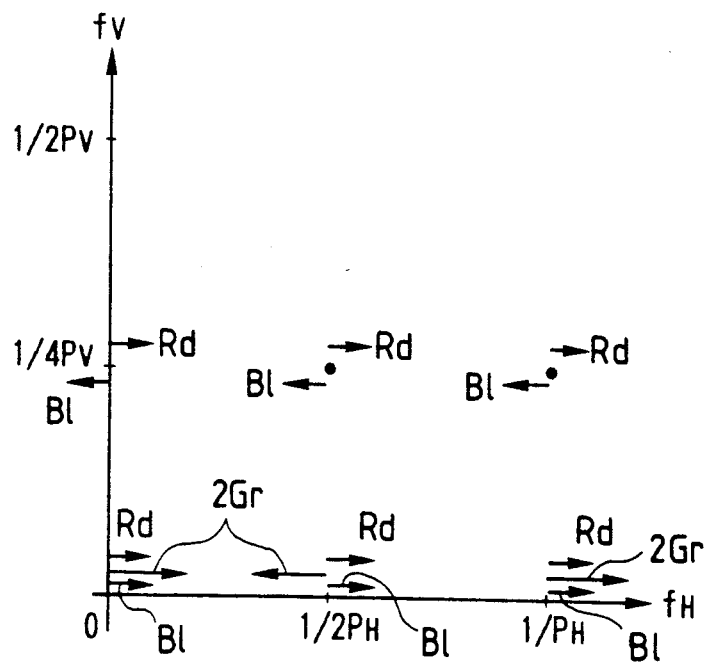
FIG. 4 is a characteristic diagram of color light carriers in the color filter arrangement of FIG. 1.
Figure 5:
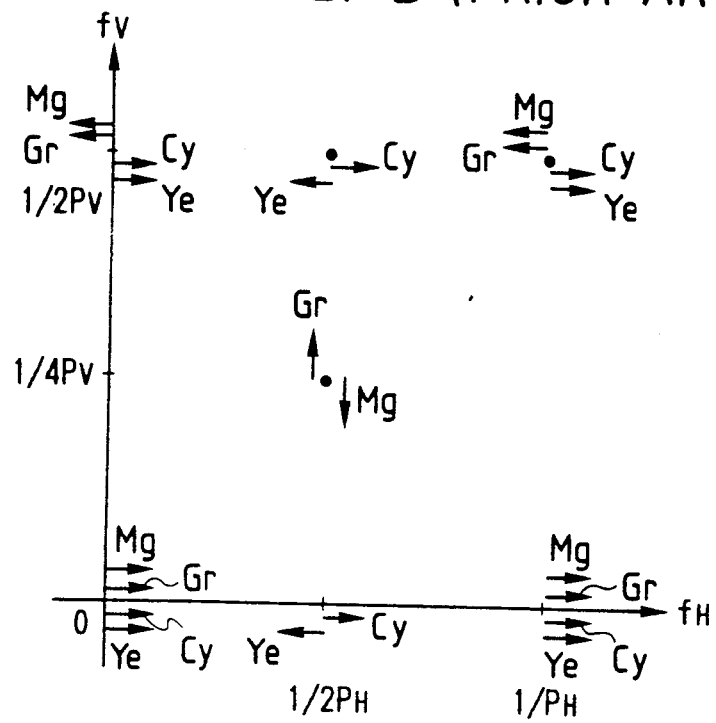
FIG. 5 is a characteristic diagram of color light carriers in the color filter arrangement of FIG. 2.
Figure 6:
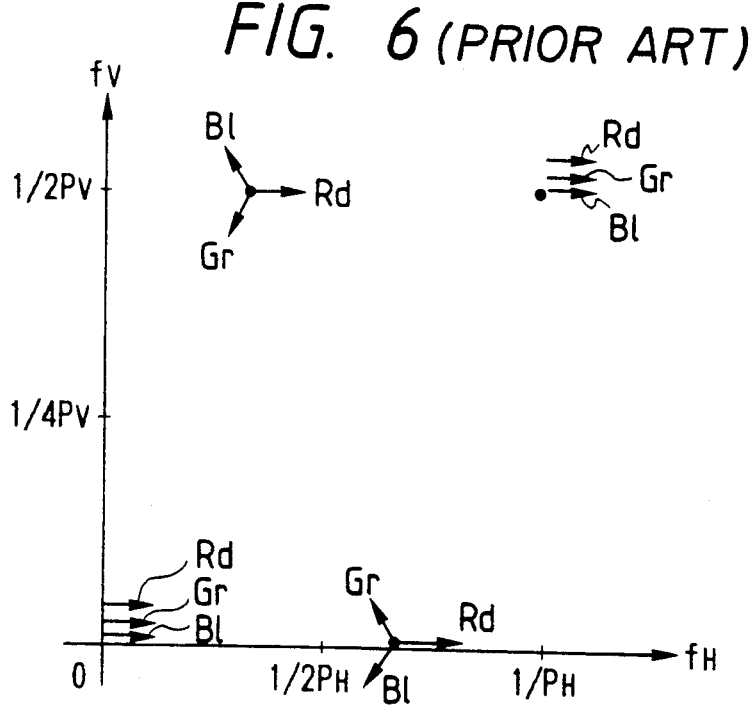
FIG. 6 is a characteristic diagram of color light carriers in the color filter arrangement of FIG. 3.
Figures 30A, 30B, 30C:
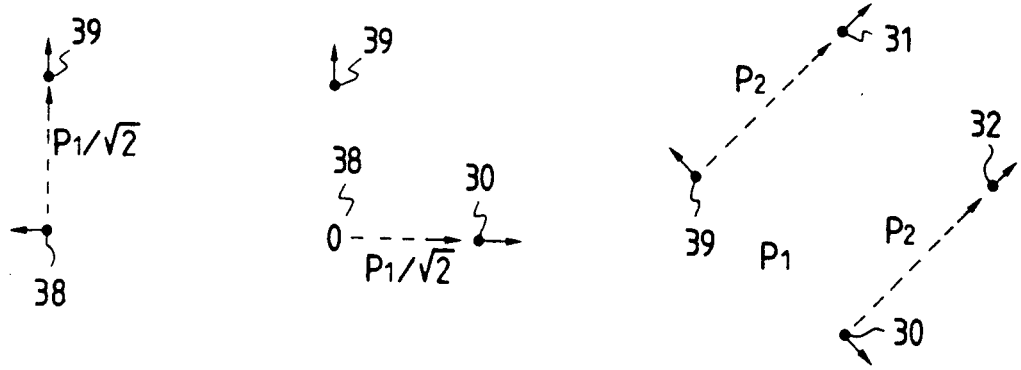
FIGS. 30A to 30C are diagrams for explaining operation of the optical low-pass filter in the seventh embodiment.

The optical low-pass filter 21 comprises a first optical member 23 consisted of double refracting plates 25, 26 and a second optical member 24 made of a double refracting plate 27. As shown, the separating directions of the double refracting plates 25, 26, 27 are turned by 90°, 0°, 45° counter-clockwise relative to the horizontal scanning direction and the magnitudes of the separation widths are $P_1/\sqrt{2}$, $P_1/\sqrt{2}$, $P_2$, respectively. FIGS. 30A to 30C show how the light beam is separated successively by the optical low-pass filter 21 of FIG. 29. As shown in FIG. 30A, a light beam incident upon the double refracting plate 25 emerges therefrom as two linearly polarized beams, i.e., an ordinary ray 38 and an extraordinary ray 39, which have the equal intensity and are polarized in the directions indicated by solid lines in the drawing. Then, those two rays enter the double refracting plate 26 having the optical axis inclined by 90° relative to the optical axis of the double refracting plate 25. At this time, since the light beam 39 becomes an ordinary ray for the double refracting plate 26, it goes straight forward through the plate 26 and emerges therefrom as is. On the other hand, since the light beam 38 becomes an extraordinary ray for the double refracting plate 26, it is refracted and emerges therefrom at a position denoted by 30. The above process is illustrated in FIG. 3B. From the first optical member 23 comprising the double refracting plates 25, 26, there are eventually obtained two light beams 39, 30 separated in directions turned by −45° counter-clockwise relative to the horizontal scanning direction with the separation width of $P_1$, as shown. Since those light beams 39, 30 are respectively polarized by 90° and 0° counter-clockwise relative to the horizontal scanning direction, they are separated by the double refracting plate 27 into fours which have the equal intensity, as illustrated in FIG. 30C. The separation width effected by the double refracting plate 27 is $P_2$. The values of $P_1$ and $P_2$ are set to meet above Equations (2) and (3), respectively, for achieving the desired performance.

Figure 31:
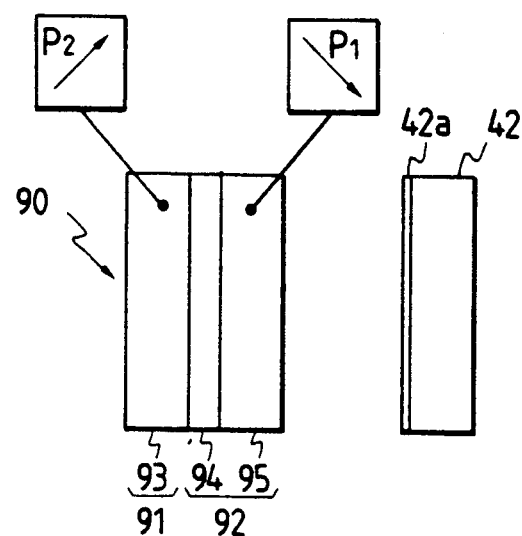
FIG. 31 is a diagram showing the construction of primary parts of an eighth embodiment of the present invention.

FIG. 31 shows the construction of primary parts of an eighth embodiment of the present invention. A color image sensor 42 and a color filter array 42a associated therewith are constituted in the same manner as the seventh embodiment. An optical low-pass filter 90 comprises a first optical member 92 consisted of a phase plate 94 for converting linearly polarized light into circularly polarized light and a double refracting plate 95, and a second optical member 91 made of a double refracting plate 93. The first optical member 92 and the second optical member 91 are not necessarily arranged in the above order from the side of the image sensor 42, and may be arranged in the reversed order. Two linearly polarized beams, i.e., an ordinary ray and an extraordinary ray, separated by the double refracting plate 93 with the separation width of $P_2$ are converted by the phase plate 94 into two circularly polarized beams which are then separated by the double refracting plate 95, having the separation width of $P_1$, into fours of the equal intensity similarly to the case of in FIG. 30C.

Figure 32:
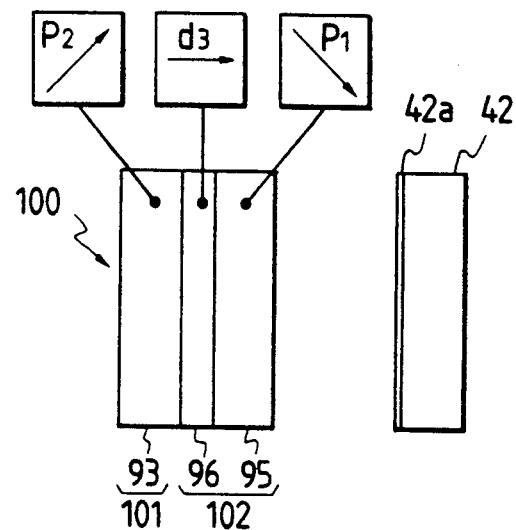
FIG. 32 is a diagram showing the construction of primary parts of a ninth embodiment of the present invention.

FIG. 32 shows the construction of primary parts of a ninth embodiment of the present invention. An optical low-pass filter 100 in this embodiment uses a double refracting plate 96 which has the separation width sufficiently smaller than the two double refracting plates 93, 95 and also has the separating directions turned by 0° counterclockwise relative to the horizontal scanning direction, in place of the phase plate 94 in the optical low-pass filter 90 of FIG. 31. Assuming that the separation width of the double refracting plate 96 is $d_3$, there emerge from the optical low-pass filter 100a total of eight light beams resulted from double-shifting of the four light beams in FIG. 30C by $d_3$ in the directions of 45°. Because of $d_3$ being sufficiently small, however, the resulting frequency characteristics are almost the same as those obtained in FIG. 30C. With the ninth embodiment, dependency of the frequency characteristics on wavelength is reduced as compared with the eighth embodiment using the phase plate 94 and the thickness of the entire device is reduced for more compact size.

In the foregoing embodiments, the optical member is constituted by a single double refracting plate, a plurality of double refracting plates, or a combination of a phase plate therewith. However, the optical member for use in the present invention is not limited to those embodiments and may be in any form, e.g., a prism placed in the optical system, so long as it has a capability to divide the light beam into twos.

With the seventh to ninth embodiments, as explained above, there can be obtained an optical low-pass filter which is combined with a color single-plate image sensor having the offset sampling structure to effectively prevent the occurrence of color moires.

A tenth embodiment of the present invention will be next described. This tenth embodiment is directed to a color image sensing device which includes an optimum optical filter as with the above seventh, eighth and ninth embodiments.

The tenth embodiment will be explained below in more detail. In the following description, the term "directions" indicates two opposite directions different from each other by 180° and the term "direction" indicates one direction.

While ideal characteristics are rhombic as mentioned above, when constituting the optical low-pass filter by using a double refracting plate or the like in practice, it is easy to make frequency characteristics zero along not only four straight lines $l_1$, $l_1'$, $l_3$, $l_3'$ passing the color carrier frequencies ($\pm\frac{1}{2}P_H$, $\pm\frac{1}{4}P_V$), which are closest to the origin, and making angles ±45° with respect to the $f_x$ axis, but also straight lines $l_2$, $l_2'$ parallel to the $f_y$ axis, as indicated by solid lines in FIG. 28. For this purpose, the optical low-pass filter is required to comprise a first optical member for dividing an incident light beam into twos spaced through a distance $P_1$ in directions turned by an angle ±45° or −45° counterclockwise relative to the horizontal scanning direction, a second optical member for dividing an incident light beam into twos spaced through a distance $P_2$ in directions parallel to the horizontal scanning direction, and a third optical member for dividing an incident light beam into twos spaced through a distance $P_3$ in directions making 90° relative to the beam dividing directions of the first optical member. In this case, the two-dimensional MTF value representing frequency characteristics of the optical low-pass filter is given by:

$$MTF(f_x, f_y) = \left| \cos\pi P_2 f_x \cdot \cos\pi P_1 \frac{f_x + f_y}{\sqrt{2}} \cdot \cos\pi P_3 \frac{f_x - f_y}{\sqrt{2}} \right| \quad (1)$$

Accordingly, the MTF value can trap the vicinity of ($\pm\frac{1}{2}P_H$, $\pm\frac{1}{4}P_V$) where the color signal carriers occur, without deteriorating the horizontal resolution, and also trap the vicinity of ($\pm 1/P_H$, $\pm\frac{1}{2}P_V$) where the luminance signal carriers occur. It is thus possible to suppress all the carriers of the color and luminance signals which are nearest to the origin.

To make the optical low-pass filter exhibit sufficient performance, since the distance from the origin to the four straight lines shown in FIG. 28 are given by;

$l_1, l_1' : \frac{1}{2}P_1$ $l_3, l_3' : \frac{1}{2}P_3;$ values of these distances are required to fall within a range of +25% about $h_0$ below;

$$h_0 = \frac{1}{\sqrt{2}} \left( \frac{1}{2P_H} + \frac{1}{4P_V} \right)$$

and the distance from the origin to the two straight lines;

$\frac{1}{2}P_2$ is required to fall within a range of ±25% about $1/P_H$. Here, the value of $h_0$ represents the distance from the origin to the four straight lines $l_1, l_1', l_2, l_2'$ when these lines pass the points $(\pm \frac{1}{2}P_H, \pm \frac{1}{2}P_V)$.

For that purpose, the separation (or division) widths $P_1, P_2, P_3$ are required to meet the following conditions:

$$\frac{2.12 P_H P_V}{P_H + 2P_V} < P_1 < \frac{3.54 P_H P_V}{P_H + 2P_V} \quad (2)$$

$$0.375 P_H < P_2 < 0.625 P_H \quad (3)$$

$$\frac{2.12 P_H P_V}{P_H + 2P_V} < P_3 < \frac{3.54 P_H P_V}{P_H + 2P_V} \quad (4)$$

In each equation, if the value exceeds an upper limit, the quantity of color moires caused by the carriers of the luminance and color signals would be increased and, if it exceeds a lower limit, the resolution of the entire system comprising the optical low-pass filter and the image sensor would be decreased. Thus, exceeding the limits would lead to the unsatisfactory result in any case.

Figure 33:
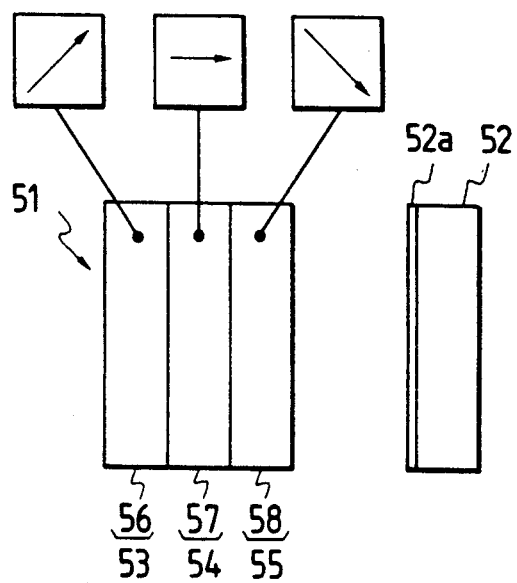
FIG. 33 is a diagram showing the construction of primary parts of a tenth embodiment of the present invention.

FIG. 33 shows the construction of primary parts of the color image sensing device implementing the tenth embodiment of the present invention. In FIG. 33, denoted by 51 is an optical low-pass filter and 52 is a color solid-state image sensor having the offset sampling structure, the image sensor being associated with a color filter array 52a which has the color filter arrangement as shown in FIG. 7 or FIG. 11.

The optical low-pass filter 51 comprises first, second and third optical members 53, 54, 55 made of double refracting plates 56, 57, 58, respectively. As shown, the separating directions of the double refracting plates 56, 57, 58 are turned by 45°, 0°, −45° counterclockwise relative to the horizontal scanning direction and the magnitudes of the separation widths are $$2\sqrt{2}\; P_H P_V/(P_H + 2P_V),\; P_H/2,\; 2\sqrt{2}\; P_H P_V/(P_H + 2P_V),$$

respectively.

Figures 34A, 34B, 34C:
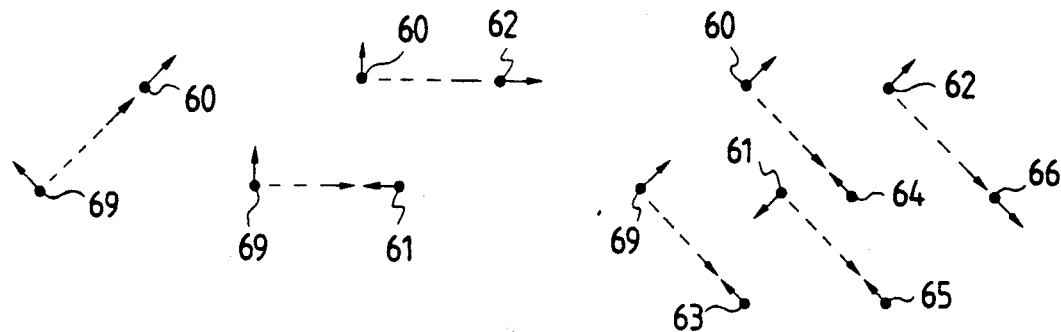
FIGS. 34A to 34C are diagrams for explaining operation of the optical low-pass filter in the seventh embodiment.
Figure 35:
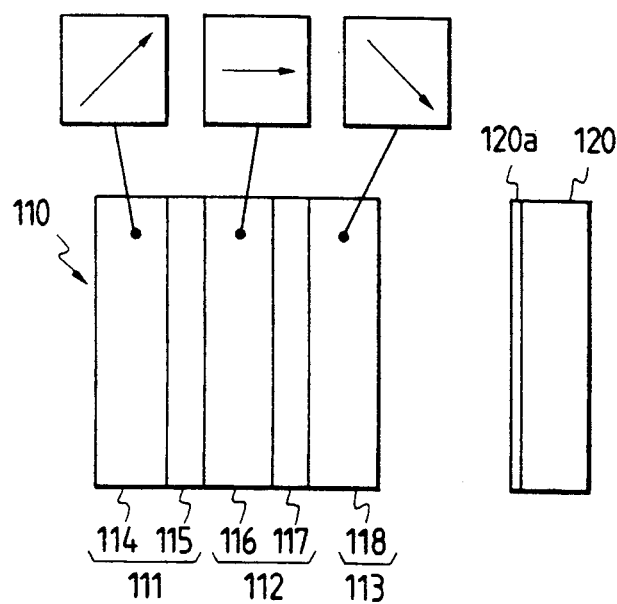
FIG. 35 is a diagram showing the construction of primary parts of an eleventh embodiment of the present invention.

FIGS. 34A to 34C show how the light beam is separated successively by the optical low-pass filter 1 of FIG. 35. As shown in FIG. 34A, an incident light beam is divided by the double refracting plate 56 in directions turned by 45° counterclockwise relative to the horizontal scanning direction to emerge therefrom as two linearly polarized beams, i.e., an ordinary ray 69 and an extraordinary ray 60, which have the equal intensity and are polarized in the directions indicated by solid lines in the drawing. Then, those two rays 69, 60 emerging from the double refracting plate 56 are divided by the double refracting plate 57 in parallel to the horizontal scanning direction into fours 69, 60, 61, 62, as shown in FIG. 34B. The polarizing directions are indicated by solid arrows in the drawing. Subsequently, as shown in FIG. 34C, the light beams 69, 60, 61, 62 emerging from the double refracting plate 57 are divided in directions turned by −45° counterclockwise relative to the horizontal scanning direction into eights 69, 60, 61, 62, 63, 64, 65, 66. Eventually, those eight light beams emerge from the optical low-pass filter 51. In this case, the two-dimensional MTF value representing frequency characteristics of the optical low-pass filter is given by:

$$MTF(f_x, f_y) = \left| \cos\frac{\pi}{2} P_H f_x \cdot \cos\pi \frac{2P_H P_V(f_x + f_y)}{P_H + 2P_V} \right. \quad (5)$$

$$\left. \cos\pi \frac{2P_H P_V(f_x + f_y)}{P_H + 2P_V} \right|$$

Accordingly, it becomes possible to satisfactorily suppress the occurrence of moires caused by the carriers of the luminance and color signals as seen from FIG. 28.

FIG. 35 shows the construction of primary parts of a color image sensing device according to an eleventh embodiment of the present invention. A color image sensor 120 and a color filter array 120a associated therewith are constituted in the same manner as the tenth embodiment. An optical low-pass filter 110 comprises a first optical member 111 consisted of a double refracting plate 114 and a phase plate 115 for converting linearly polarized light into circularly polarized light, a second optical member 112 consisted of a double refracting plate 116 and a phase plate 117, and a third optical member 113 made of a double refracting plate 118. The double refracting plate 114 divides an incident light beam into twos, i.e., an ordinary ray and an extraordinary ray, spaced through a distance $P_1$ in directions turned by 45° counterclockwise relative to the horizontal scanning direction. Those two rays emerging from the double refracting plate 114 are converted by the phase plate 115 from linearly polarized light into circularly polarized light. The light beams emerging from the phase plate 115 are divided by the double refracting plate 116 through a distance $P_2$ in directions parallel to the horizontal scanning direction, and then converted by the phase plate 117 from linearly polarized light into circularly polarized light. The light beams emerging from the phase plate 117 are divided by the double refracting plate 118 through a distance $P_3$ in directions turned by −45° counterclockwise relative to the horizontal scanning direction. Eventually, a total of eight light beams emerge from the optical low-pass filter 90 similarly to the case shown in FIG. 34C. Therefore, the two-dimensional MTF value of the optical low-pass filter 90 is expressed by above Equation (1) and thus can provide the same frequency characteristics as the tenth embodiment.

In the tenth and eleventh embodiments, the first, second and third optical members are not necessarily arranged in the above order from the object side, and may be arranged in any order so long as the optical low-pass filter has frequency characteristics meeting Equation (1). Furthermore, in those embodiments, the optical member is constituted by a single double refracting plate or a combination of a phase plate therewith. However, the optical member for use in the present invention is not limited to those embodiments and may be in any form, e.g., a prism placed in the optical system, so long as it has a capability to divide the light beam into twos.

With the tenth and eleventh embodiments, as explained above, there can be obtained an optical low-pass filter which is combined with a color single-plate image sensor having the offset sampling structure to effectively prevent the occurrence of color moires.

Meanwhile, in the case of the aforementioned color image sensing device of the first embodiment as shown in FIG. 9, i.e., when the signal from the sensor 1 is simply subjected to low-pass filtering by the interpolation filter 4 to produce the luminance signal, there occurs the following phenomenon.

Generally, responses of four color filters Mg, Cy, Ye, Gr to some constant object are a little different from one another. Therefore, even if luminance of the object is constant, the arrangement structure of FIG. 7 is reflected in the luminance signal resulted from the signal processing through the system of FIG. 9 and thus appears in the form of checker patterns.

When the four color filters are arranged as shown in FIG. 7, characteristics of the color light carriers are given as shown in FIG. 8. The above phenomenon can be regarded as a phenomenon caused by the DC component turning back to the carrier position indicated by P in FIG. 8. Preventing that phenomenon in the simplest manner requires to carry out signal processing such that response of the carrier at the point P in FIG. 8 becomes zero. For example, by setting a luminance signal Y at the position of $Gr^{(1)}$ in FIG. 7 as follows;

$$Y = \tfrac{1}{2}Gr^{(1)} + \tfrac{1}{4}Mg^{(0)} + \tfrac{1}{4}Mg^{(1)}$$

a horizontal low-pass filter for trapping the horizontal frequency component $\tfrac{1}{2}P_H$ in FIG. 8 is realized. Accordingly, the point P is also trapped and the checker patterns are removed.

Also, by adding information data on every two pixels spaced from each other by two pixels in the vertical direction, a vertical low-pass filter for trapping the vertical frequency component $\tfrac{1}{2}P_V$ can be realized to remove the checker patterns.

However, if the above horizontal or vertical processing is performed, the horizontal or vertical band would be so limited as to deteriorate the resolution.

A twelfth embodiment of the present invention is intended to solve the foregoing problem and is directed to an image signal processor which can remove the checker patterns in the image sensing device with the filter as shown in FIG. 7, without reducing the resolution.

To this end, the image signal processor of this embodiment is constituted as follows:

(1) an image signal processor comprising decision means for determining whether or not a constant region exhibiting small luminance change in a predetermined direction is present within an image, processing means for carrying out low-pass filtering of a luminance signal in the predetermined direction, and selection means for selecting the processing means to carry out the low-pass filtering when the decision means determines the presence of the constant region; or (2) an image signal processor in which the decision means makes a decision based on absolute values of outputs of horizontal and vertical band-pass filters for the luminance signal.

With the image signal processors of (1) and (2), when the constant region exhibiting small luminance changes in a predetermined direction is present within an image, low-pass filtering of the luminance signal is carried out in the predetermined direction.

With the image signal processors of (2), the division of the constant region exhibiting small luminance changes is made based on absolute values of outputs of horizontal and vertical band-pass filters for the luminance signal.

Figure 36:
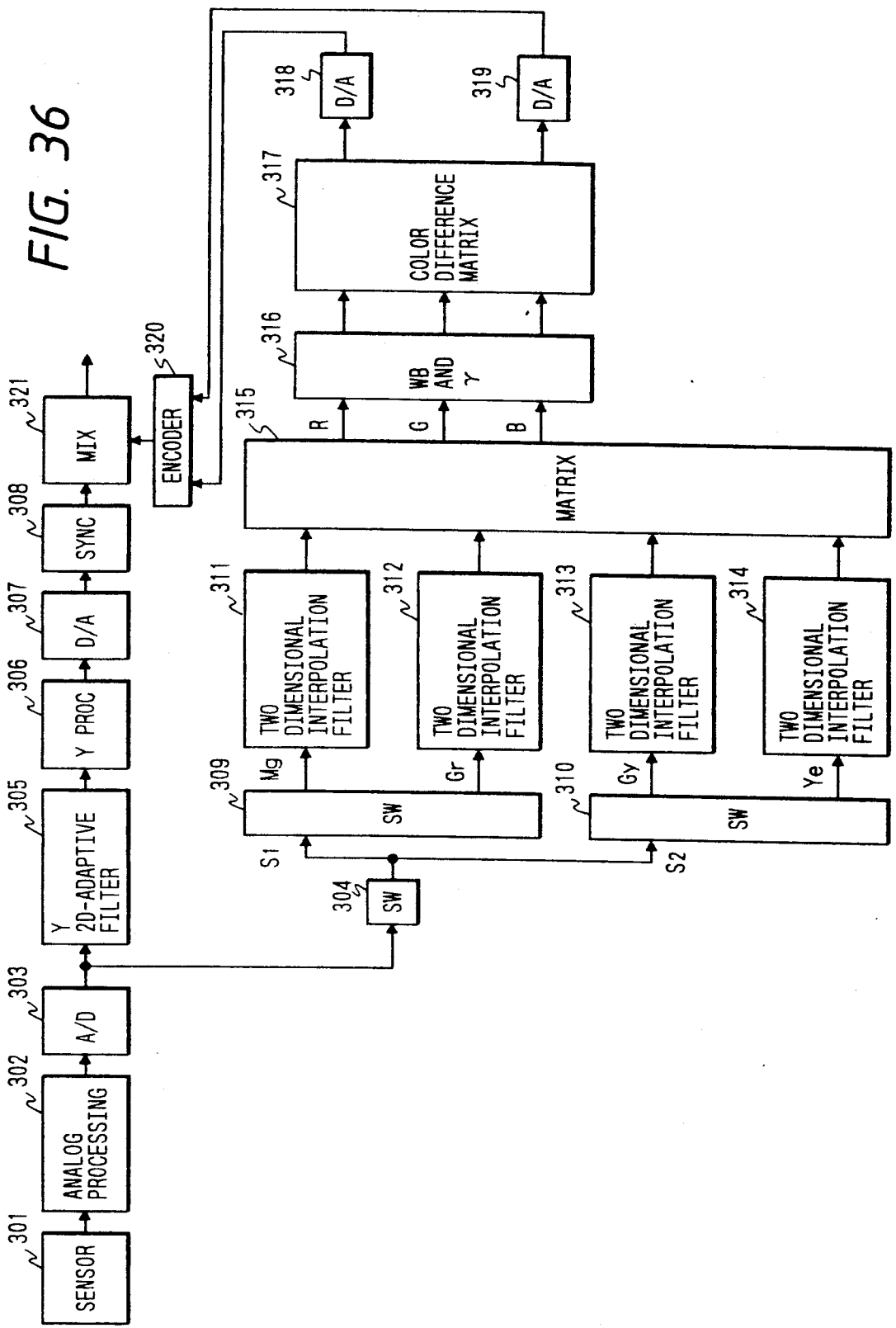
FIG. 36 is a block diagram of a twelfth embodiment.

The twelfth embodiment will be described below in more detail. FIG. 36 is a block diagram of a signal processor for a video camera which implements the twelfth embodiment.

A sensor 301 is associated with the color filter array shown in FIG. 7 for reading two rows of the array in the zigzag form during one horizontal scan period (1H) as seen from the drawing. Accordingly, all the pixels are read out once for one field. Assuming now that the read-out clock has frequency of $f_s$, an output of the sensor 301 is changed in the order of Mg, Cy, Gr, Ye for each clock. The output signal is applied to an analog processing unit 302 for signal processing such as AGC (automatic gain control), and then subjected to A/D (analog-to-digital) conversion by an A/D converter 303. The A/D converter used desirably has 10 or more bit precision.

The resulting digital signal is inputted to a later-described adaptive filter processing unit 305 for a luminance signal to create a high-frequency luminance signal free of checker patterns as mentioned above. The resulting signal is applied to a luminance processing unit 306 for standard video signal processing such as $\gamma$ conversion and blanking, and then subjected to D/A (digital-to-analog) conversion by a D/A converter 307. The resulting analog signal is added in a synch signal adding unit 308 with a synch signal for a standard TV signal.

A switch 304 is operated to change over an input signal for each half of the clock $f_s$ so that a signal Mg-Gr is outputted to S1 and a signal Cy-Ye is outputted to S2.

Those signals changed over to S1 and S2 are inputted to the switches 309 and 310, respectively, so that they are separated into signals Mg, Gr, Cy, Ye for respective signals. Since these color signals each have the offset structure as shown in FIG. 7, lacked information is interpolated by two-dimensional interpolation filters 311, 312, 313, 314.

In a matrix operation unit 315, primary color signals R, G, B are obtained from the four interpolated color signals Mg, Gr, Cy, Ye through matrix operation below:

$$\begin{bmatrix} R \\ G \\ B \end{bmatrix} = [A] = \begin{bmatrix} Mg \\ Gr \\ Cy \\ Ye \end{bmatrix} \qquad (1)$$

Here, the matrix A is a matrix of 3 row and 4 column optimized to make spectroscopic characteristics $Mg(\lambda)$, $Gr(\lambda)$, $Cy(\lambda)$, $Ye(\lambda)$ of the sensor 201 for Mg, Gr, Cy, Ye approach ideal spectroscopic characteristics $Mg(\lambda)$, $Gr(\lambda)$, $Cy(\lambda)$ for RGB specified in the NTSC system.

The primary color signals R, G, B thus obtained are applied to a color processing unit 316 for signal processing such as white balance (WB) and $\gamma$ conversion, following which they are inputted to a color difference matrix operation unit 317. The color difference matrix operation unit 317 creates two color difference signals R-Y, B-Y which are subjected to D/A conversion by D/A converters 318, 319, respectively.

After that, the color difference signals are subjected to orthogonal modulation by an encoder 320 for mixing in a mixing unit 321 with the signal, comprising the luminance signal Y and the synch signal S, and the mixed result is outputted as the standard TV signal.

Figure 37:
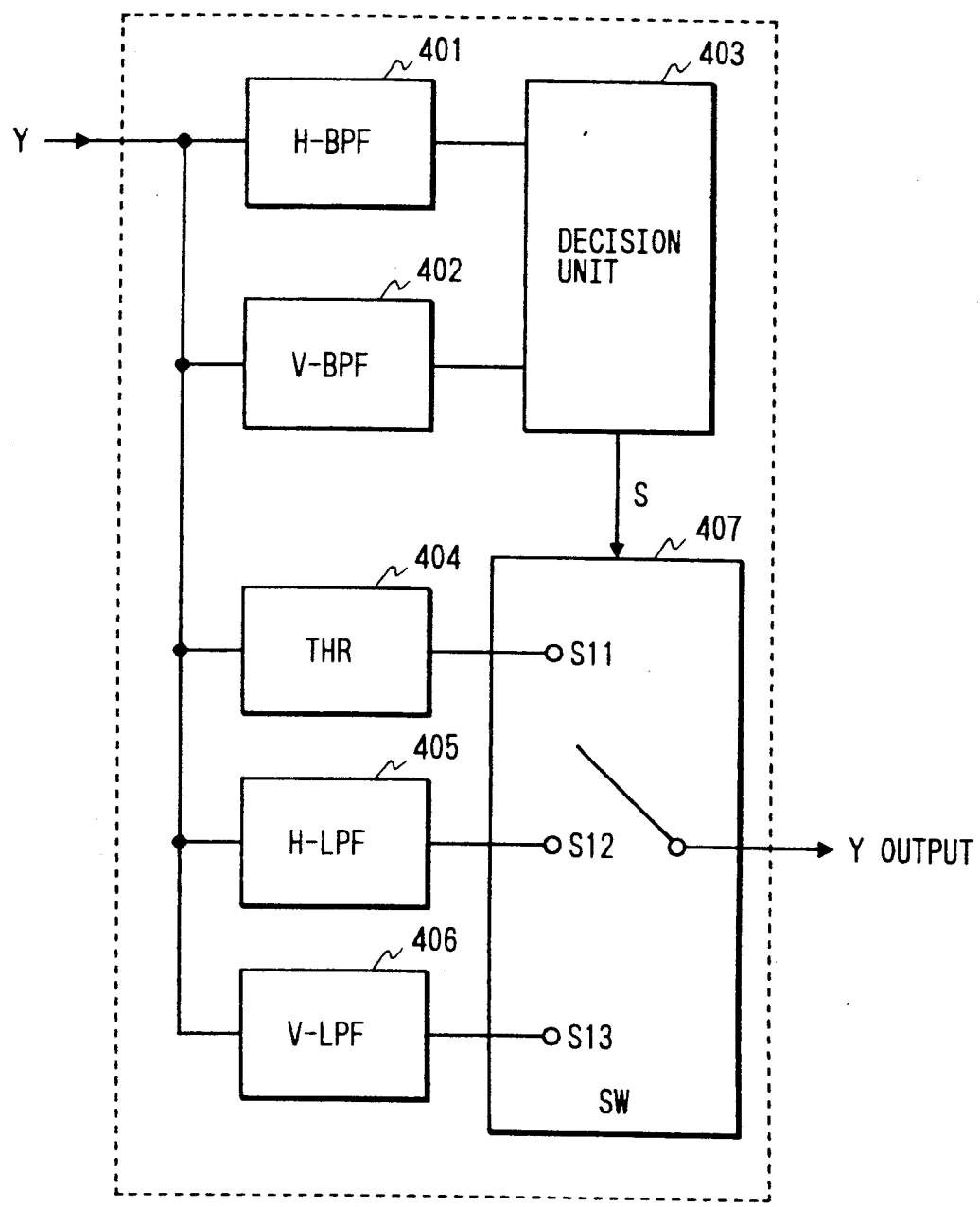
FIG. 37 is a block diagram of an adapted filter process for a luminance signal in the twelfth embodiment.

FIG. 37 shows the construction of the adaptive filter processing unit 305 for the luminance signal. The inputted luminance signal Y is the result of reading the pixels in the zigzag form in the order of Mg, Cy, Gr and Ye.

Since carriers are present at positions corresponding to the frequency ($\frac{1}{4}P_H$) equal to $\frac{1}{4}$ of the clock $f_s$ in the horizontal direction and 240 TV lines ($\frac{1}{4}P_V$) in the vertical direction, as mentioned before, it is required to determine the magnitudes of frequency components at those carrier positions.

Figure 38:
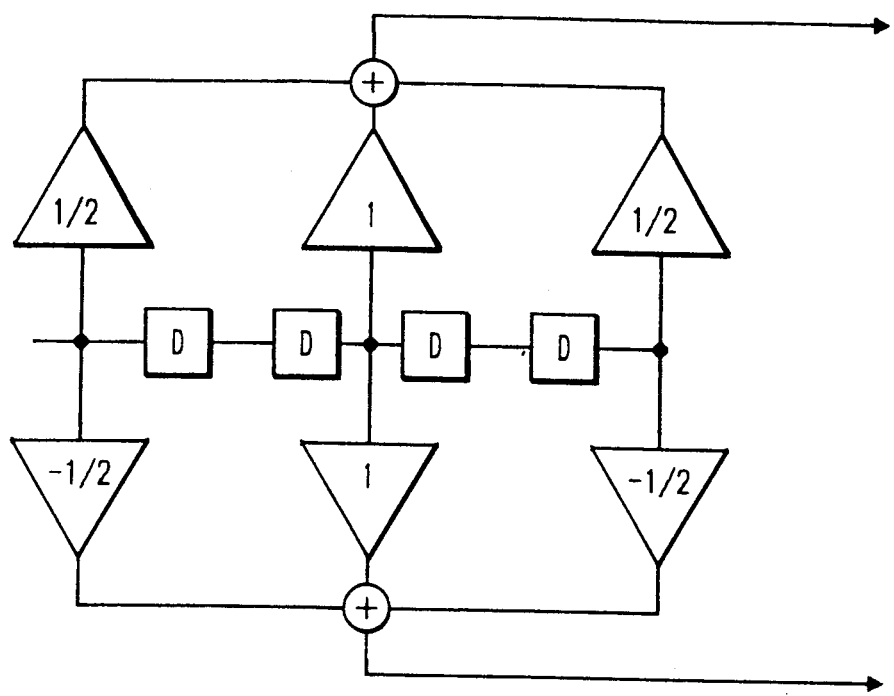
FIGS. 38 and 39 are diagrams showing the construction of a filter used in the twelfth embodiment.
Figure 39:
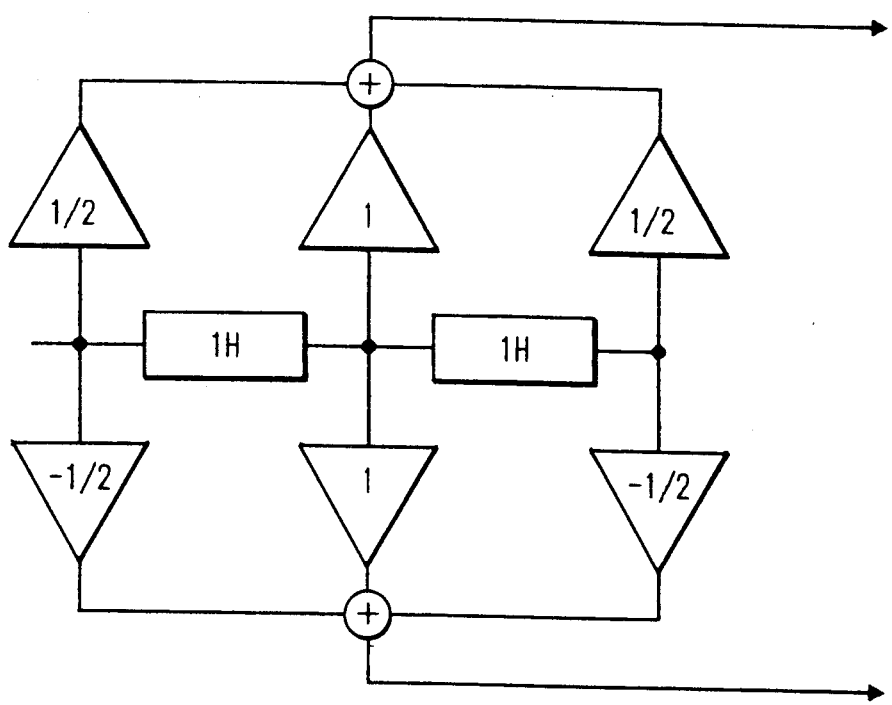

A horizontal band-pass filter 401 comprises, as shown in the lower half of FIG. 38, a digital filter with five taps of ($-\frac{1}{2}$, 0, 1, 0, $-\frac{1}{2}$). A vertical band-pass filter 402 comprises, as shown in the lower half of FIG. 39, a digital filter with three taps of ($-\frac{1}{2}$, 1, $-\frac{1}{2}$) by using a 1H (horizontal scan period) memory.

A decision unit 403 outputs a select signal S to a switch 407 depending on absolute values of outputs of the horizontal band-pass filter 401 and the vertical band-pass filter 402.

In response to the select signal S from the decision unit 403, the switch 407 is able to select one of a through signal output 404, an output of a horizontal low-pass filter 405, and an output of a vertical low-pass filter 405. The horizontal low-pass filter 405 can be constituted by, as shown in the upper half of FIG. 38, sharing delays and taps with the horizontal band-pass filter 401. Here, the horizontal low-pass filter 405 comprises a low-pass filter with five taps of ($\frac{1}{2}$, 0, 1, 0, $\frac{1}{2}$) to make response zero along the line $T_H$ in FIG. 8, thereby enabling to remove the checker patterns. Also, the vertical low-pass filter 406 can be constituted by, as shown in the upper half of FIG. 39, sharing the 1H memory and taps with the vertical band-pass filter 401. Here, the vertical low-pass filter 406 comprises a low-pass filter with three taps of ($\frac{1}{2}$, 1, $\frac{1}{2}$) to make response zero along the line $T_V$ in FIG. 8, thereby enabling to remove the checker patterns. Operation of the decision unit 403 can be controlled in accordance with the following table:

| Case | | Selection |
|---|---|---|
| 1 | $\underline{A} \cap \underline{B}$ | S1 |
| 2 | $\overline{A} \cap \underline{B}$ | S2 |
| 3 | $\underline{A} \cap \overline{B}$ | S3 |
| 4 | $A \cap B$ | S2 or S3 |

It is here assumed that A represents an event that an absolute value of the output of the horizontal band-pass filter 401 is larger than a certain value, and B represents an event that an absolute value of the output of the vertical band-pass filter 402 is larger than a certain value. $\overline{A}$, $\overline{B}$ respectively represent reversed events of A, B.

For example, in Case 1 where the object structure is largely changed in both the horizontal and vertical directions, there occur A and B. In this case, the checker patterns will not be awkward even if they are present. Conversely, if the signals are subjected to the low-pass filtering, the image would be blurred. Therefore, the switch S11 is selected.

As another example, in Case 2 where the object has the vertical component, the switch S12 is selected to effect the low-pass filtering in the horizontal direction. By so doing, the checker patterns can be removed without impairing information on the object.

In the above embodiment, the outputs of the horizontal and vertical band-pass filters are combined with each other to determine whether or not the object structure is abruptly changed in the portion of interest. Alternatively, it is also possible to determine changes in the object structure in oblique directions by using oblique band-pass filters and effect the oblique low-pass filtering if the changes are small.

With this embodiment, as described above, the checker patterns can be prevented without deteriorating the resolution.

Meanwhile, in the first embodiment, the color signals are processed after conversion of the four complementary color signals Mg, Cy, Ye, Gr, having been interpolated, into the primary color signals R, G, B through the matrix operation, as shown in FIG. 9. This color processing technique is called a matrix method or primary color separating method and described in the specification of Japanese Patent Application No. 63-281456 filed by the present applicant and the article "Simultaneous RGB Processing in Image Mixing CCD Camera" by Nishimura, etc., Technical Report of Television Society of Japan, TEBS 89-9 ED 89-13, Feb. 1989.

In the RGB conversion unit 12 of FIG. 9, the four complementary color signals Mg, Cy, Ye, Gr are converted into the primary color signals R, G, B through the matrix operation below:

$$\begin{bmatrix} R \\ G \\ B \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{bmatrix} Mg \\ Gr \\ Cy \\ Ye \end{bmatrix} \quad (1)$$

On this occasion, the oblique pattern of bright and dark areas are considered as shown in FIG. 40. The fat lines represent bright areas and the thin lines represent dark areas. That pattern corresponds to a wave at the point shown in FIG. 8.

For the wave in the above pattern, as will be seen from FIG. 40, response to Mg and Cy is large, while response to Gr and Ye is small. Accordingly, if the signals R, G, B are calculated in accordance with Equation (1), a false color would be caused in spite of an achromatic object.

Further, for the pattern as shown in FIG. 41, response to Mg and Ye is large, while response to Gr and Cy is small, thus resulting in the similar problem.

A thirteenth embodiment of the present invention is made to solve the above problem and is directed to an image signal processor which can suppress the occurrence of false colors and realize high image quality. The image signal processor comprises image pattern detecting means for detecting an image pattern which tends to cause a false color, color signal processing means for making color signal processing adapted for the image pattern, and selection means for selecting the color signal processing means depending on an output of the image pattern detecting means to make the color signal processing.

The color signal processing means may carry out the process for converting color signals into achromatic signals.

With the image signal processor thus arranged, upon detection of the image pattern which tends to cause a false color, the color signal processing adapted for the detected image pattern is carried out.

Figure 42:
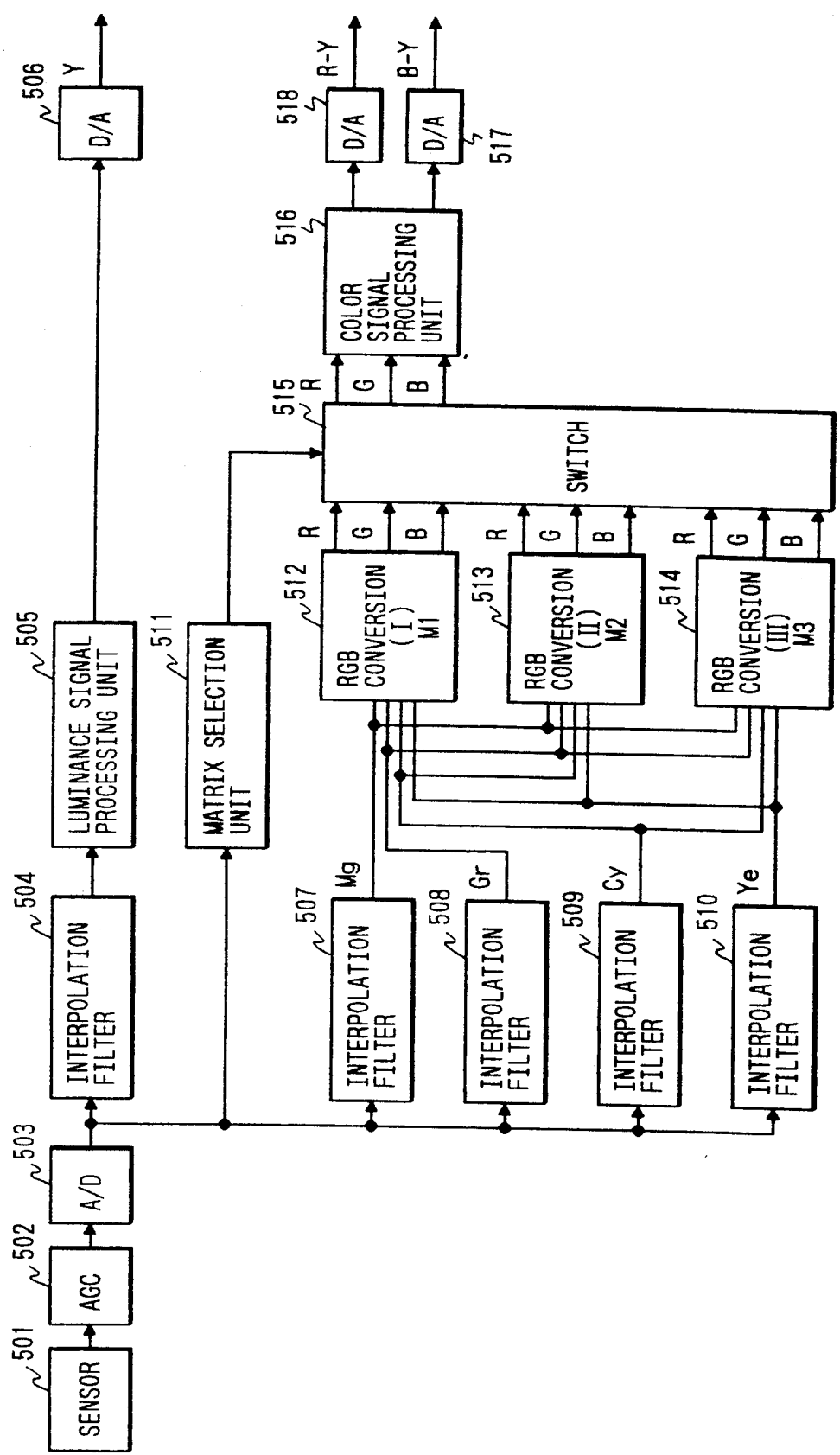
FIG. 42 is a block diagram of a thirteenth embodiment.

The thirteenth embodiment will be described below in more detail. FIG. 42 is a block diagram of a signal processor for a video camera which implements the thirteenth embodiment.

A sensor 501 is associated with the color filter array shown in FIG. 7 for reading two rows of the array in the zigzag form during one horizontal scan period (1H)

as seen from the drawing. Accordingly, all the pixels are read out once for one field. Assuming now that the read-out clock has frequency of fs, an output of the sensor 501 is changed in the order of Mg, Cy, Gr, Ye for each clock. The output signal is applied to an analog processing unit 502 for signal processing such as AGC (automatic gain control), and then subjected to A/D (analog-to-digital) conversion by an A/D converter 503. The A/D converter used desirably has 10 or more bit precision.

The resulting digital signal is inputted to an interpolation filter 504 and then to a luminance processing unit 505 for standard video signal processing such as γ conversion and blanking, followed by D/A (digital-to-analog) conversion by a D/A converter 506. Further, the resulting analog signal is added in a period signal adding unit (not shown) with a synch signal for a standard TV signal.

On the other hand, the output of the A/D converter 503 is separated into color signals Mg, Gr, Cy, Ye and then interpolated two-dimensionally in interpolation filters 507 to 510. This process is described in the specification of Japanese Patent Application No. 63-281456 filed by the present applicant, for example, and hence will not be explained further herein. RGB conversion units 512, 513, 514 convert the four color signals Mg, Gr, Cy, Ye into three primary color signals R, G, B in accordance with above Equation (1) using matrix coefficient different from one another.

A matrix selection unit 511 determines, as described later, which one of the RGB conversion units should be used to minimize the occurrence of false colors, and the decision result is outputted to a switch 515. The switch 515 selects one set of RGB outputs from the RGB conversion units 512, 513, 514 depending on the decision result of the matrix selection unit 511.

Differences among the RGB conversion units 512, 513, 514 will be next explained.

The RGB conversion unit 512 performs the matrix operation for to minimize the occurrence of false colors for the bright and dark patterns shown in FIG. 40. Specifically, for the pattern of FIG. 40 where it is assumed that Mg and Cy are bright, while Gr and Ye are dark, R is expressed below in accordance with above Equation (1):

$$R = a_{11}Mg + a_{12}Gr + a_{13}Cy + a_{14}Ye \quad (2)$$

As explained in the above-cited reference, too, a false color Rm of the red color for the pattern of FIG. 40 is expressed by multiplying +1 to the terms of Mg and Cy and −1 to the terms of Gr and Ye as follows:

$$Rm = a_{11}Mg - a_{12}Gr + a_{123}Cy - a_{14}Ye \quad (3)$$

When Rm becomes zero, the occurrence of false colors is minimized. Thus:

$$a_{11}Mg + a_{13}Cy = a_{12}Gr + a_{14}Ye \quad (4)$$

Since the above discussion is similarly applied to other colors, the conditions to be met are expressed below:

$$a_{k1}Mg + a_{k3}Cy = a_{k2}Gr + a_{k4}Ye \quad (5)$$

A method of determining the matrix coefficients, which are also optimized in color reproduction under the restricting conditions of (5), is described in the above-cited Japanese Patent Application No. 63-281456. As a result of executing the matrix operation using the thus-determined coefficients in the RGB conversion unit 512, the output of the unit 512 is modified such that the occurrence of false colors is minimized for the pattern of FIG. 40.

Likewise, the conditions of minimizing the occurrence of false colors for the pattern of FIG. 41 is given by:

$$a_{k1}Mg + a_{k4}Ye = a_{k2}Gr + a_{k3}Cy \quad (6)$$

As a result of executing the matrix operation, which is optimized in color reproduction under the restricting conditions of (6), in the RGB conversion unit 513, the output of the unit 513 is modified such that the occurrence of false colors is minimized for the pattern of FIG. 41.

The RGB conversion unit 514 performs the operation of converting the color signals into achromatic signals when both the patterns of FIGS. 40 and 41 are overlapped with each other in the color matrix. Means for conversion into achromatic signals is implemented by utilizing the following relationship, for example:

$$a_{1i} = a_{2i} = a_{3i} \ (I = 1, 2, 3, 4) \quad (7)$$

When both the patterns of FIGS. 40 and 41 are overlapped with each other, this corresponds to an edge region of the object. In such a region, the image quality will be less deteriorated even if the color signals are converted into achromatic signals.

Figure 43:
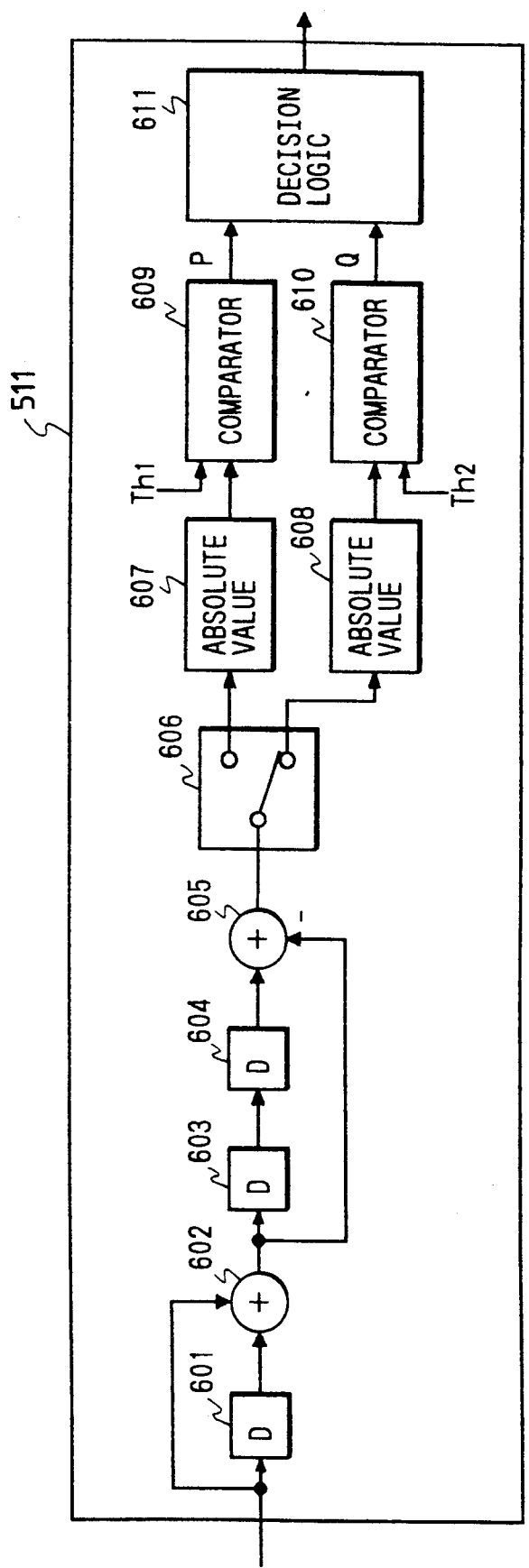
FIG. 43 is a block diagram showing a matrix selection unit in the thirteenth embodiment.

FIG. 43 shows the construction of the matrix selection unit 511. The signal from the sensor 501 through zigzag reading of the pixels is inputted to the matrix selection unit 511 while repeating the cycle of Mg, Cy, Gr and Ye in this order. Accordingly, the result of adding the input signal and the signal which is obtained by delaying the input signal one data in a delay 601, in an adder 602 is given by repetition of Mg+Cy/Cy+Gr/Gr+Ye/Ye+Mg. The result of taking the difference between the above summation signal and the signal which is obtained by delaying the summation signal two data in delay 603 and 604, in a subtracter 605 is given by repetition of (Mg+Cy)−(Gr+Ye)/(Cy+Gr)−(Ye+Mg)/(Gr+Ye)−(Mg+Cy)/(Ye+Mg)−(Cy+Gr). If the pattern component of the object as shown in FIG. 41 is large, an absolute value of (Cy+Gr)−(Ye+Mg) is increased. If the pattern component of FIG. 40 is large, an absolute value of (Mg+Cy)−(Gr+Ye) is increased. Accordingly, by changing over the data on a data-by-data basis by a switch 606, the output is separated such that ±[(Mg+Cy)−(Gr+Ye)] is led to an upper absolute value detecting unit 607 and ±[(Cy+Gr)−(Ye+Mg)] is led to a lower absolute value detecting unit 608. The absolute value detecting units 607, 608 take absolute values of those outputs, which are then compared with present thresholds Th1, Th2 in comparators 609, 610, thereby producing logical outputs P, Q. P is 1 if ≧Th1 and 0 if <Th1, while Q is 1 if ≧Th2 and 0 if <Th2. A decision logic 611 determines the matrix to be used by using the logic table shown in FIG. 44.

The conversion of the color signals into the achromatic signals is not always required to be performed in the RGB conversion unit 514, and may be achieved by using the so-called chroma-killer process to make the color difference signals R-Y, B-Y zero in the color signal processing unit 516.

Further, it is also possible to input a horizontal address X and a vertical address Y of the pixel to the switch 515 and, if the outputs of P and Q are zero, to switch over M1 and M2 alternately as shown in FIG. 45.

The color filters of the sensor 501 are not limited to Mg, Cy, Gr, Ye and may have any form, including pure such as R, $G_1$, $G_2$, B, so long as four colors are arranged in the offset structure.

In addition, this embodiment treats the two image patterns which tend to cause false colors, and includes the three color signal processing means 512 to 514 adapted for those image patterns. However, this embodiment is not limited to such an arrangement and may be implemented in any form including one or more image patterns which tend to cause false colors, and one or more color signal processing means adapted for the respective image patterns.

With this embodiment, as explained above, there can be obtained an image signal processor which has high resolution and can realize high image quality, while reducing the occurrence of false colors, even for such an image pattern tending to cause false colors.

What is claimed is:

1. An image signal processor comprising:
   image pattern detecting means for detecting different image patterns of an image signal;
   color signal processing means for performing on the image signal different color signal processings which are respectively adapted for reduction of false colors caused by said different image patterns to be detected; and
   selection means for selecting one of said different color signal processings performed by said color processing means on the basis of a detection result of said image pattern detecting means.

2. An image signal processing according to claim 1, wherein said color signal processing means carries out the process for converting color signals into achromatic signals.

3. An image signal processor according to claim 1, wherein said image pattern detecting means detects changes of an image in both the horizontal and vertical directions for detecting a pattern of the image.

4. An image signal processor according to claim 3, wherein said image pattern detecting means includes a horizontal band-pass filter and a vertical band-pass filter.

5. An image signal processor comprising:
   processing means for performing low-pass filtering of a luminance signal in different predetermined directions;
   determination means for determining whether or not there are small luminance changes in an image in said predetermined different directions; and
   selection means for selecting the low-pass filtering performed by said processing means in the direction in which small luminance change is determined to exist by said determination means, when said determination means determines that a small luminance change exists.

6. An image signal processor according to claim 5, wherein said decision means makes a decision based on absolute values of outputs of horizontal and vertical band-pass filters for the luminance signal.

7. An image pickup apparatus comprising:
   (a) image pickup means for converting an image pickup light from an object into electrical signal, said image pickup means having a plurality of color filters arranged in a predetermined order on a surface thereof;
   (b) detection means for detecting that there is a possibility that a false color is generated, on the basis of a relation between the arrangement of said plurality of color filters and a pattern of the object;
   (c) processing means for processing said electrical signal output from said image pickup means with one of a plurality of predetermined characteristics; and
   (d) control means for changing said predetermined characteristic of said processing means according to an output of said detection means.

8. An apparatus according to claim 7, wherein said plurality of color filters includes Ye, Cy, G and Ma filters.

9. An apparatus according to claim 7, wherein said predetermined characteristics include a matrix coefficient for color separation.

10. An apparatus according to claim 7, wherein said processing means performs a processing for producing color signals of R, G and B from the output of said image pickup means.

* * * * *

UNITED STATES PATENT AND TRADEMARK OFFICE
CERTIFICATE OF CORRECTION

PATENT NO. : 5,280,347

DATED : January 18, 1994

INVENTOR(S) : Akihiko Shiraishi, Akira Suga, Takashi Sasaki

It is certified that error appears in the above-indentified patent and that said Letters Patent is hereby corrected as shown below:

Col. 1, line 17. Change "B1" to -- B$\ell$ --

Col. 1, line 26. Change "consisted" to -- consisting -- and

Change "horizontal two" to -- two horizontal --

Col. 1, line 26, 27. Change "vertical four" to -- four vertical --

Col. 1, line 31. Change "B1" to -- B$\ell$ --

Col. 1, line 32. Change "consisted" to -- consisting --

Col. 1, line 32, 33. Change "horizontal three" to -- three horizontal --

Col. 1, line 33. Change "vertical one" to -- one vertical --

Col. 1, line 48. Change "then" to -- them --

Col. 1, line 51. Change "disappeared" to -- disappear --

Col 1, line 52. After "but" insert -- do -- and

Change "disappeared" to -- disappear --

Col. 1, line 58. Delete "are"

UNITED STATES PATENT AND TRADEMARK OFFICE
CERTIFICATE OF CORRECTION

PATENT NO. : 5,280,347

DATED : January 18, 1994

INVENTOR(S) : Akihiko Shiraishi, Akira Suga, Takashi Sasaki

It is certified that error appears in the above-indentified patent and that said Letters Patent is hereby corrected as shown below:

Col. 1, line 59. Change "disappeared" to -- disappear --

Col. 1, line 65. Delete "are" and

Change "disappeared" to -- disappear --

Col. 3, line 20. After "of" insert -- the --

Col. 3, line 28. Change "an" to -- a --

Col. 5, line 63. Change "seventh" to -- tenth --

Col. 6, line 27. Change "Magenta" to -- magenta --

Col. 6, line 43. Delete "are" and

Change "disappeared" to -- disappear --

Col. 6, line 54. Delete "is" and change "disappeared" to -- disappears --

Col. 6, line 60. Change "less caused" to -- caused less --

Col. 7, line 9. Change "interpolate" to -- interpolating --

Col. 7, line 31. After "through" insert -- the --

Col. 8, line 20. After "as" insert -- a -- and delete "there occur"

Col. 8, line 21. After "signals" insert -- occur --

UNITED STATES PATENT AND TRADEMARK OFFICE
CERTIFICATE OF CORRECTION

PATENT NO. : 5,280,347

DATED : January 18, 1994

INVENTOR(S) : Akihiko Shiraishi, Akira Suga, Takashi Sasaki

It is certified that error appears in the above-indentified patent and that said Letters Patent is hereby corrected as shown below:

Col. 8, line 25. Delete "be" and

Change "disappeared" to -- disappear --

Col. 8, line 30. Change "$(+\frac{1}{2}P_H, \frac{1}{2}P_V)$" to -- $\pm\frac{1}{2}P_H, \mp\frac{1}{2}P_V)$ Col. 8, line 34. After "unit" insert -- 12 --

Col. 9, line 9, 12. Change "B1" to -- B$\ell$ --

Col. 9, line 17. Delete "that"

Col. 9, line 22. After "relative" insert -- to --

Col. 9, line 31. Delete "are" and

Change "disappeared" to -- disappear --

Col. 11, line 7, 43. Change "dot" to -- dotted --

Col. 12, line 32. Delete "are" and change "disappeared" to -- disappear --

Col. 12, line 33. Delete "there occur"

Col. 12, line 34. Before "at" insert -- occur --

Col. 12, line 47. Change "sings" to -- signs --

Col. 12, line 52. After "as" insert -- an --

Col. 13, line 10. Change "dot" to -- dotted --

UNITED STATES PATENT AND TRADEMARK OFFICE
CERTIFICATE OF CORRECTION

PATENT NO. : 5,280,347
DATED : January 18, 1994
INVENTOR(S) : Akihiko Shiraishi, Akira Suga, Takashi Sasaki It is certified that error appears in the above-indentified patent and that said Letters Patent is hereby corrected as shown below:

Col. 13, line 17. Change "exactly" to -- exact --

Col. 13, line 18. Change "the" to -- where --

Col. 13, line 47. Change "dot" to -- dotted --

Col. 14, line 16. Change "$a_{i1}a_{i2}=$" to -- $a_{i1}+a_{i2}=$ --

Col. 14, line 22. Delete "there occur"

Col. 14, line 23. Before "at" insert -- occur --

Col. 14, line 27. Delete "satisfied"

Col. 15, line 11. Change "regards" to -- regard --

Col. 15, line 35. Change "$1, 1_1', 1_2, 1_2'$" to
-- $\ell_1, \ell_{1'}, \ell_2, \ell_{2'}$ --

Col. 15, line 36. Change "$(\frac{1}{2}P_H, \frac{1}{2}PV)$" to -- $(\pm\frac{1}{2}P_H, \pm\frac{1}{2}P_V)$ --

Col. 15, line 37. Delete "the"

Col. 16, line 1. Change "$1_1, 1_{1'}:\frac{1}{2}P_1$" to -- $\ell_1, \ell_{1'}:\frac{1}{2}P_1$ --

Col. 16, line 2. Change "$1_2, 1_{2'}:\frac{1}{2}P_2$" to -- $\ell_2, \ell_{2'}:\frac{1}{2}P_2$ --

Col. 16, line 13. Change "$1_1, 1_1', 1_2, 1_2'$" to -- $\ell_1, \ell_1', \ell_2, \ell_2'$ --

Col. 16, line 34. Change "denotes" to -- denoted --

UNITED STATES PATENT AND TRADEMARK OFFICE
CERTIFICATE OF CORRECTION

PATENT NO. : 5,280,347
DATED : January 18, 1994
INVENTOR(S) : Akihiko Shiraishi, Akira Suga, Takashi Sasaki It is certified that error appears in the above-indentified patent and that said Letters Patent is hereby corrected as shown below:

Col. 16, line 40. Change "consisted" to -- consisting --

Col. 17, line 20. Change "consisted" to -- consisting --

Col. 17, line 34. Delete "of"

Col. 17, line 46. Change "emerge" to -- emerges --

Col. 17, line 47. Change "resulted" to -- resulting --

Col. 18, line 15. Change "$1_1, 1_{1'}, 1_3, 1_{3'}$," to
-- $\ell_1, \ell_{1'}, \ell_3, \ell_{3'}$ --

Col. 18, line 18. Change "$1_2, 1_{2'}$," to -- $\ell_2, \ell_{2'}$ --

Col. 18, line 23. Change "=45°" to -- +45° --

Col. 18, line 51. Change "$1_{1'}, 1_{1'}$," to -- $\ell_{1'}, \ell_{1'}$ --

Col. 18, line 53. Change "$1_{3'}, 1_3$," to -- $\ell_{3'}, \ell_3$ --

Col. 19, line 1. Change "$1_1, 1_{1'}, 1_2, 1_{2'}$, to
-- $\ell_1, \ell_{1'}, \ell_2, \ell_{2'}$ --

Col. 19, line 45. Change "1" to -- 51 --

Col. 20, line 18, 21. Change "consisted" to -- consisting --

Col. 21, line 7. Change "resulted" to -- resulting --

Col. 21, line 16. Delete "to"

UNITED STATES PATENT AND TRADEMARK OFFICE
CERTIFICATE OF CORRECTION

PATENT NO. : 5,280,347
DATED : January 18, 1994
INVENTOR(S) : Akihiko Shiraishi, Akira Suga, Takashi Sasaki It is certified that error appears in the above-indentified patent and that said Letters Patent is hereby corrected as shown below:

Col. 21, line 16. Change "carry" to -- carrying --

Col. 22, line 8. After "has" insert -- a --

Col. 22, line 24, 25. Change "synch" to -- sync --

Col. 22, line 33. Change "lacked" to -- missing --

Col. 22, line 63. Change "synch" to -- sync --

Col. 23, line 40. Change "$\underline{A} \cap B$" to -- $A \cap B$ --
$A \cap \underline{B}$ $\overline{A} \cap B$
$\underline{A} \cap \underline{B}$ $A \cap \overline{B}$
$A \cap B$ $\overline{A} \cap \overline{B}$ Col. 25, line 3. After "has" insert -- a --

Col. 25, line 19. Change "synch" to -- sync --

Col. 25, line 40. Delete "for"

Col. 25, line 54. Change "$+a_{123}$" to -- $+a_{13}$ --

UNITED STATES PATENT AND TRADEMARK OFFICE
CERTIFICATE OF CORRECTION

PATENT NO. : 5,280,347

DATED : January 18, 1994

INVENTOR(S) : Akihiko Shiraishi, Akira Suga, Takashi Sasaki

It is certified that error appears in the above-indentified patent and that said Letters Patent is hereby corrected as shown below:

Col. 27, line 38. Change "processing" to -- processor --

Signed and Sealed this

Thirteenth Day of September, 1994

Attest:

BRUCE LEHMAN

Attesting Officer

Commissioner of Patents and Trademarks